US012725486B2

(12) United States Patent
Winata et al.

(10) Patent No.: US 12,725,486 B2
(45) Date of Patent: Sep. 1, 2026

(54) GAMING OPERATIONS AND GAMING DEVICE HAVING MULTIPLE METERS FOR STORING AND TRACKING PERSISTENT AWARDS

(71) Applicant: Aristocrat Technologies Australia Pty Limited, North Ryde (AU)

(72) Inventors: Danny Winata, Oatlands (AU); Karen Kendall, Toongabbie (AU); Antoon Visser, Kensington (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 245 days.

(21) Appl. No.: 18/516,754

(22) Filed: Nov. 21, 2023

(65) Prior Publication Data

US 2024/0395110 A1 Nov. 28, 2024

(30) Foreign Application Priority Data

May 26, 2023 (AU) ................................ 2023203312

(51) Int. Cl.
*G07F 17/32* (2006.01)

(52) U.S. Cl.
CPC ................................ *G07F 17/3258* (2013.01)

(58) Field of Classification Search
CPC .. G07F 17/32; G07F 17/3213; G07F 17/3244; G07F 17/3258; G07F 17/326; G07F 17/3267; G07F 17/34
See application file for complete search history.

(56) References Cited

U.S. PATENT DOCUMENTS

| | | | | |
|---|---|---|---|---|
| 8,454,429 | B2 * | 6/2013 | Jaffe | G07F 17/3258 463/16 |
| 9,251,659 | B2 * | 2/2016 | Guinn | G07F 17/3267 |
| 11,551,527 | B2 * | 1/2023 | Cohn | G07F 17/3267 |
| 12,333,908 | B2 * | 6/2025 | Meyer | G07F 17/3213 |
| 2013/0184045 | A1 * | 7/2013 | Vermaak | G07F 17/3267 463/20 |
| 2020/0250923 | A1 * | 8/2020 | Ceniceroz | G09G 3/20 |
| 2020/0342715 | A1 * | 10/2020 | Hiten | G07F 17/3267 |
| 2021/0279999 | A1 * | 9/2021 | Meyer | G07F 17/3262 |
| 2022/0051523 | A1 * | 2/2022 | Chan | G06F 7/588 |
| 2022/0262206 | A1 * | 8/2022 | Djemal | G07F 17/3258 |
| 2023/0087870 | A1 * | 3/2023 | Hughes | G07F 17/3244 463/1 |
| 2023/0154286 | A1 * | 5/2023 | Warms | G07F 17/34 463/20 |
| 2024/0105014 | A1 * | 3/2024 | Suslik | G07F 17/3213 |

* cited by examiner

*Primary Examiner* — Milap Shah
(74) *Attorney, Agent, or Firm* — Armstrong Teasdale LLP

(57) ABSTRACT

A gaming device includes a memory, and processor that when executed by the processor to cause the processor to cause a selection of symbols to display in a plurality of columns of symbol positions, where the selection for each column is performed from a corresponding reel strip that includes symbols including award value symbols; cause a display of a current first award total stored in the memory and associated with a first column of symbol positions, and determine a threshold value for the first column. In response to the selected symbols of the first column including an award value symbol, the processor may increase the current first award total by a value of the award value symbol, determine if the current first award total meets or exceeds the threshold value, and if so, output an award that includes at least the current first award total.

20 Claims, 31 Drawing Sheets

300

| | 341 | 342 | 343 | 344 | 345 |
|---|---|---|---|---|---|
| | Reel Strip 1 | Reel Strip 2 | Reel Strip 3 | Reel Strip 4 | Reel Strip 5 |
| 301 | A | 10 | COR | COR | PIC1 |
| 302 | COR | J | COR | PIC2 | SCAT |
| 303 | PIC3 | Q | 9 | PIC3 | COR |
| 304 | PIC2 | Q | PIC2 | 9 | Q |
| 305 | K | A | PIC1 | Q | A |
| 306 | SCAT | COR | 10 | A | COR |
| 307 | COR | PIC1 | K | A | Q |
| 308 | A | J | WILD | 10 | WILD |
| 309 | J | Q | J | COR | K |
| 310 | COR | COR | COR | K | 9 |
| 311 | A | 9 | Q | PIC1 | SCAT |
| 312 | PIC3 | K | PIC3 | SCAT | 10 |
| 313 | 10 | 10 | | A | COR |
| 314 | 9 | SCAT | Q | J | Q |
| 315 | K | WILD | Q | COR | A |
| 316 | PIC1 | J | 10 | A | COR |
| 317 | J | COR | A | PIC3 | K |
| 318 | Q | A | A | 9 | A |
| 319 | COR | PIC2 | COR | 9 | J |
| 320 | A | PIC3 | Q | PIC2 | COR |
| 321 | PIC1 | 9 | A | PIC1 | pIC2 |
| 321 | A | COR | COR | WILD | 10 |
| 323 | J | SCAT | COR | COR | J |
| 324 | COR | COR | SCAT | Q | Q |
| 325 | PIC2 | Q | 9 | A | PIC3 |
| 330 | ... | ... | ... | ... | ... |

*FIG. 3*

FIG. 19
1900
$700,001.58
$5,000
$1,000
LUCKY ZONE™
JACKPOT
FEATURE WON!
COLLECT 5
OR
TO WIN
PRESS START FEATURE
X2
1901

GAMING OPERATIONS AND GAMING DEVICE HAVING MULTIPLE METERS FOR STORING AND TRACKING PERSISTENT AWARDS

CROSS-REFERENCE TO RELATED APPLICATION

This application claims the benefit of priority to Australia Patent Application No. 2023203312, filed May 26, 2023, the content and disclosure of which is hereby incorporated by reference herein in its entirety.

FIELD

The present application relates to a gaming device, a method of operating a gaming device and a system that stores persistent award totals associated with each column of a display matrix, displays the award totals on an award meter associated with each column of the display matrix, and randomly awards one of the persistent award totals when a trigger is satisfied.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

SUMMARY

There is disclosed a gaming device, a method of operating a gaming device, and a computer readable storage medium with award totals associated with columns of symbol positions (reels) that are awarded when a win condition is satisfied with respect to a specific column, such as a symbol having a award value on it causing the award total to reach or exceed a hidden value.

An example embodiment describes a gaming device at least one memory storing with instructions stored thereon, and at least one processor in communication with the at least one memory, where the instructions, when executed by the at least one processor, cause the at least one processor to cause a selection of symbols to display in a plurality of columns of symbol positions, where the selection for each column is performed from a corresponding reel strip comprising symbols including award value symbols; cause a display of at least a current first award total stored in the memory and associated with a first column of symbol positions, and determine a threshold value for the first column. In response to the selected symbols of the first column including an award value symbol, that at least one processor may increase the current first award total by a value of the award value symbol; determine if the current first award total meets or exceeds the threshold value, and if so, output an award comprising at least the current first award total.

Another example embodiment describes a method of electronic gaming implemented by at least one processor in communication with at least one memory, the method comprising causing a selection of symbols to display in a plurality of columns of symbol positions, where the selecting for each column is performed from a corresponding reel strip comprising symbols including award value symbols; causing a display of at least a current first award total stored in the memory and associated with a first column of symbol positions; determining a threshold value for the first column; in response to the selected symbols of the first column including an award value symbol, increasing the current first award total by a value of the award value symbol; determining if the current first award total meets or exceeds the threshold value, and if so, outputting an award comprising at least the current first award total.

Another example embodiment describes at least one non-transitory computer-readable storage medium with instructions stored thereon that, in response to execution by at least one processor, cause the at least one processor to cause a selection of symbols to display in a plurality of columns of symbol positions, wherein the selection for each column is performed from a corresponding reel strip comprising symbols including award value symbols; cause a display of at least a current first award total stored in a memory and associated with a first column of symbol positions; determine a threshold value for the first column; in response to the selected symbols of the first column including an award value symbol, increase the current first award total by a value of the award value symbol; determine if the current first award total meets or exceeds the threshold value, and if so, output an award comprising at least the current first award total.

BRIEF DESCRIPTION OF THE DRAWINGS

FIG. 3 illustrates an example reel strip layout.

DETAILED DESCRIPTION

Figure 1:
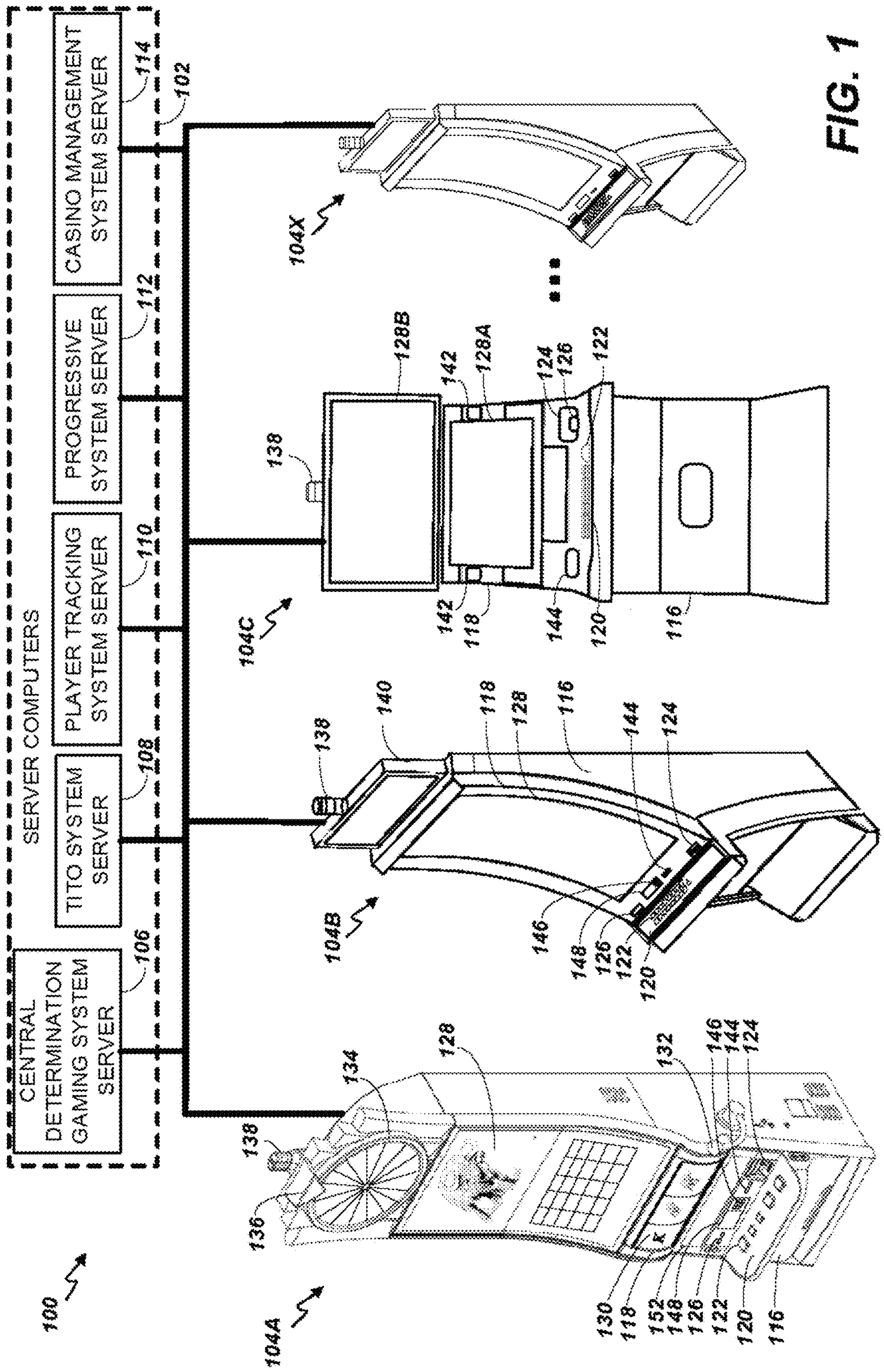
FIG. 1 is an exemplary diagram showing several EGMs networked with various gaming related servers.

In the example embodiment, the systems, methods and gaming operations described herein include a gaming device that stores persistent award totals associated with each column of a display matrix, displays the award totals on an award meter associated with each column of the display matrix, and randomly awards one of the persistent award totals when a trigger is satisfied. In some cases, the trigger may be a value or a range of values that is stored in memory and associated with each column of the display matrix. These threshold values may be randomly determined and set before game play initiates. In addition, the starting award total value that is assigned to each column may also be randomly determined. Thus, in the example embodiment, the device may determine an award value to assign to each column. The meter for that column may then display that value. The device may also assign a trigger threshold value to each column so that when the award value for one of the columns reaches the threshold value, the trigger is met and the award total is awarded. The award value for each column is persistent at least until the one of the award values is awarded. In addition, the award values for each column may grow in response to a value symbol (COR) being displayed in a designated location of the display matrix. The meter shows the increase in the total award value for the column until the award is provided.

The embodiments of the present disclosure represent a technical improvement in the art of electronic gaming device, machines, systems, and operating for such electronic gaming device or systems. Technical improvements represented by the present disclosure include using the RNG to randomly determine an award value to be assigned to each column included in the display matrix at the start of game play, storing those values in memory so that they are persistent through the game play, displaying those award values on meters associated with each column of the display matrix so that a player is able to easily see the current status of each award value for each column, using an RNG to randomly determine the threshold values assigned to each column for triggering the award wherein these threshold values are stored within memory, using an RNG to randomly select a position within a reel column at which each award symbol of a game instance will be displayed on each column of the display matrix. As each value symbol is displayed, the displayed value being added to the award value for that column where the symbol is displayed.

Randomizing the position at which award symbols are displayed, in addition to which award symbol displays any multiplier, may allow a smaller set of payline pathways to be stored. Pathways may include a plurality of spinning reel game instances that designate award symbols and in which columns they are displayed. Such an implementation may reduce memory requirements. The feature may further increase the degree of randomness in a displayed output. Another feature includes setting a relevant award total (e.g., a first award total) to be awarded at the conclusion of free game instances, rather than awarding the award total immediately. This feature enables any awarded award total to be incremented further during the balance of the feature games upon further COR symbols being selected in a relevant column. In this manner, the improvement allows for a potentially larger award total to be awarded at the conclusion of the free games.

The technical problems addressed herein include at least one of: (i) inability of known systems to persistently track and display award values for each column; (ii) inability to randomly assign award values for each column at the start of game play to facilitate controlling of RTP while improving variability in game play; (iii) inability of known system to randomly assign threshold values to each column for triggering the awarding of the assigned award value to further facilitate controlling of RTP while improving variability in game play; (iv) inability of known systems to efficiently communicate persistent award values associated with each column in play; and (v) inability of known systems to improve an amount of data storage and use of computation resources be designating an award value for each column of a display matrix while randomly increasing the value until a threshold value is reached.

The resulting technical effects and/or technical benefits achieved by this disclosure include at least one of: (i) ability to persistently track and display award values for each column; (ii) ability to randomly assign award values for each column at the start of game play to facilitate controlling of RTP while improving variability in game play; (iii) ability to randomly assign threshold values to each column for triggering the awarding of the assigned award value to further facilitate controlling of RTP while improving variability in game play; (iv) ability to efficiently communicate persistent award values associated with each column in play; (v) ability to improve an amount of data storage and use of computation resources be designating an award value for each column of a display matrix while randomly increasing the value until a threshold value is reached; (vi) displaying large quantities of complex information in a relatively small display area; (v) communicating complex information with easy-to-understand animations on a display; (vi) clearly indicating when a player has entered a bonus game; (vii) efficiently communicating different game rules for the bonus game on the display during game play; and (viii) providing versatility as to which devices (e.g., EGMs, mobile devices, etc.) the games described herein may be played on because of the efficient display area designs described herein.

Various interface improvements are provided herein to efficiently and effectively communicate information. For instance, while advancement toward and during play a number of free games, as described herein, various animations are provided to communicate incrementation of multipliers, accumulation of multipliers, and a status of the advancement toward the number of free games (e.g., a number of spins remaining in the hold and spin game before the free games are provided).

FIG. 1 illustrates several different models of EGMs which may be networked to various gaming related servers. The present invention can be configured to work as a system 100 in a gaming environment including one or more server computers 102 (e.g., slot servers of a casino) that are in communication, via a communications network, with one or more gaming devices 104A-104X (EGMs, slots, video poker, bingo machines, etc.). The gaming devices 104A-104X may alternatively be portable and/or remote gaming devices such as, but not limited to, a smart phone, a tablet, a laptop, or a game console.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, the present invention may, in one or more embodiments, be practiced on a stand-alone gaming device such as gaming device 104A, gaming device 104B or any of the other gaming devices 104C-104X. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door, which provides access to the interior of the cabinet. Gaming device 104A typically includes a button area or button deck 120 accessible by a player that is configured with input switches or buttons 122, an access channel for a bill validator 124, and/or an access channel for a ticket printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game. In embodiments where the reels are mechanical, mechanisms can be employed to implement greater functionality. For example, the boundaries of the gaming display area boundaries of the gaming display area 118 may be defined by one or more mechanical shutters controllable by a processor. The mechanical shutters may be controlled to open and close, to correspondingly reveal and conceal more or fewer symbol positions from the mechanical reels 130. For example, a top boundary of the gaming display area 118 may be raised by moving a corresponding mechanical shutter upwards to reveal an additional row of symbol positions on stopped mechanical reels. Further, a transparent or translucent display panel may be overlaid on the gaming display area 118 and controlled to override or supplement what is displayed on one or more of the mechanical reel(s).

In many configurations, the gaming device 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A. In some embodiments a ticket reader can be used which is only capable of reading tickets. In some embodiments, a different form of token can be used to store a cash value, such as a magnetic stripe card.

In some embodiments, a player tracking card reader 144, a transceiver for wireless communication with a player's smartphone, a keypad 146, and/or an illuminated display 148 for reading, receiving, entering, and/or displaying player tracking information is provided in gaming device 104A. In such embodiments, a game controller within the gaming device 104A can communicate with the player tracking server system 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
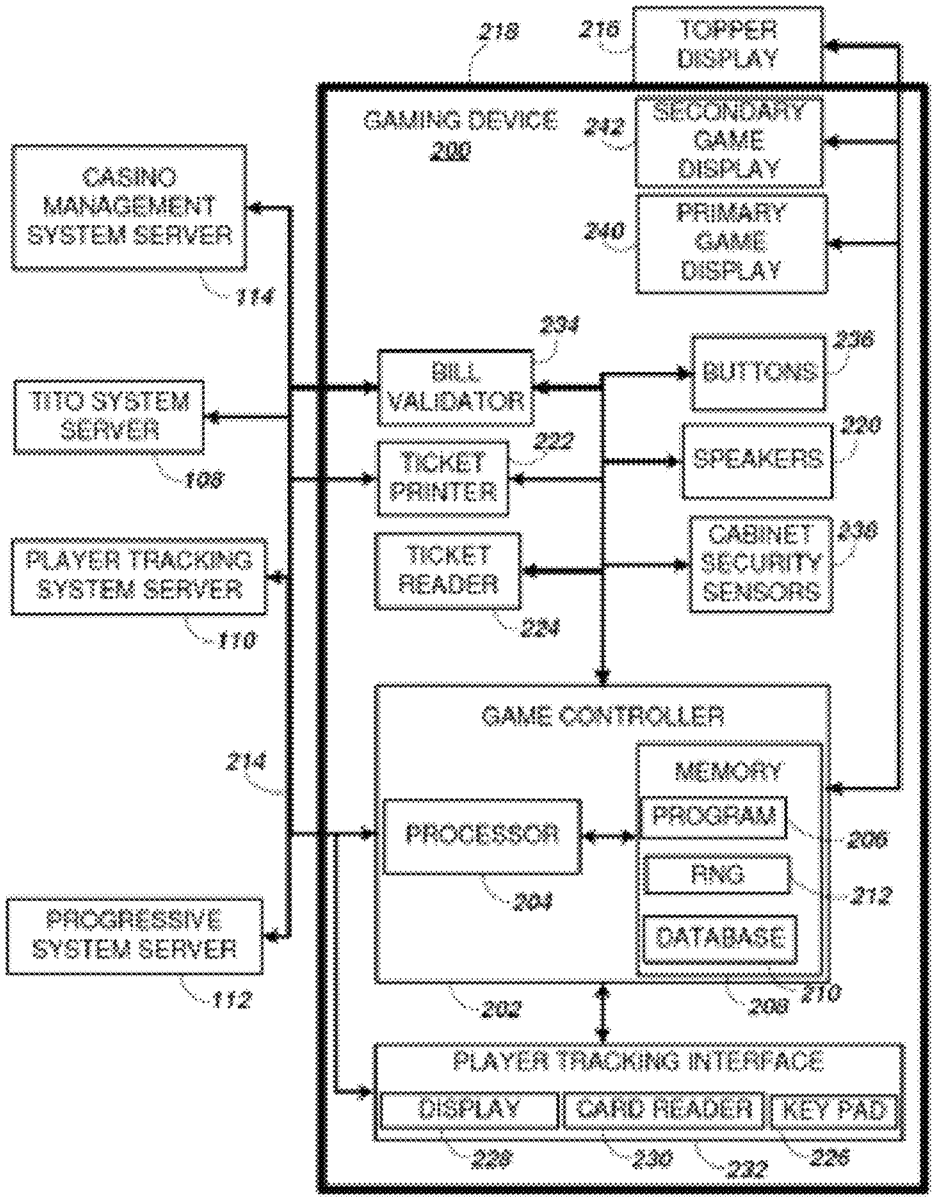
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present invention necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 118 which opens to provide access to the interior of the gaming device 104B. The main or service door 118 is typically used by service personnel to refill the ticket-out printer 126 and collect bills and tickets inserted into the bill validator 124. The door 118 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance. In some embodiments, the random number generator 212 is a pseudo-random number generator.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above main cabinet 218. The gaming cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a credit input mechanism such as a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The credit balance may be stored in a meter in memory 208 (or in a separate hardware meter). In some embodiment, memory 208 implements a credit meter to monitor to the credit balance and has a win meter that monitors any amounts won during any game instance(s) resulting from the wager. The balance of the win meter is transferred to the credit meter prior at the conclusion of the game instances. The player may also optionally insert a loyalty club card into the card reader 230. In some embodiments, the loyalty club card may also act as a credit input mechanism, by allowing a player to transfer funds from a centrally stored balance in order to establish a credit balance. During the game, the player views the game outcome on the game displays 240, 242. Other game and award information may also be displayed.

When the player is done, he/she cashes out the credit balance (typically by pressing a cash out button to receive a ticket from the ticket printer 222). The ticket may be "cashed-in" for money or inserted into another machine to establish a credit balance for play.

Figure 5:
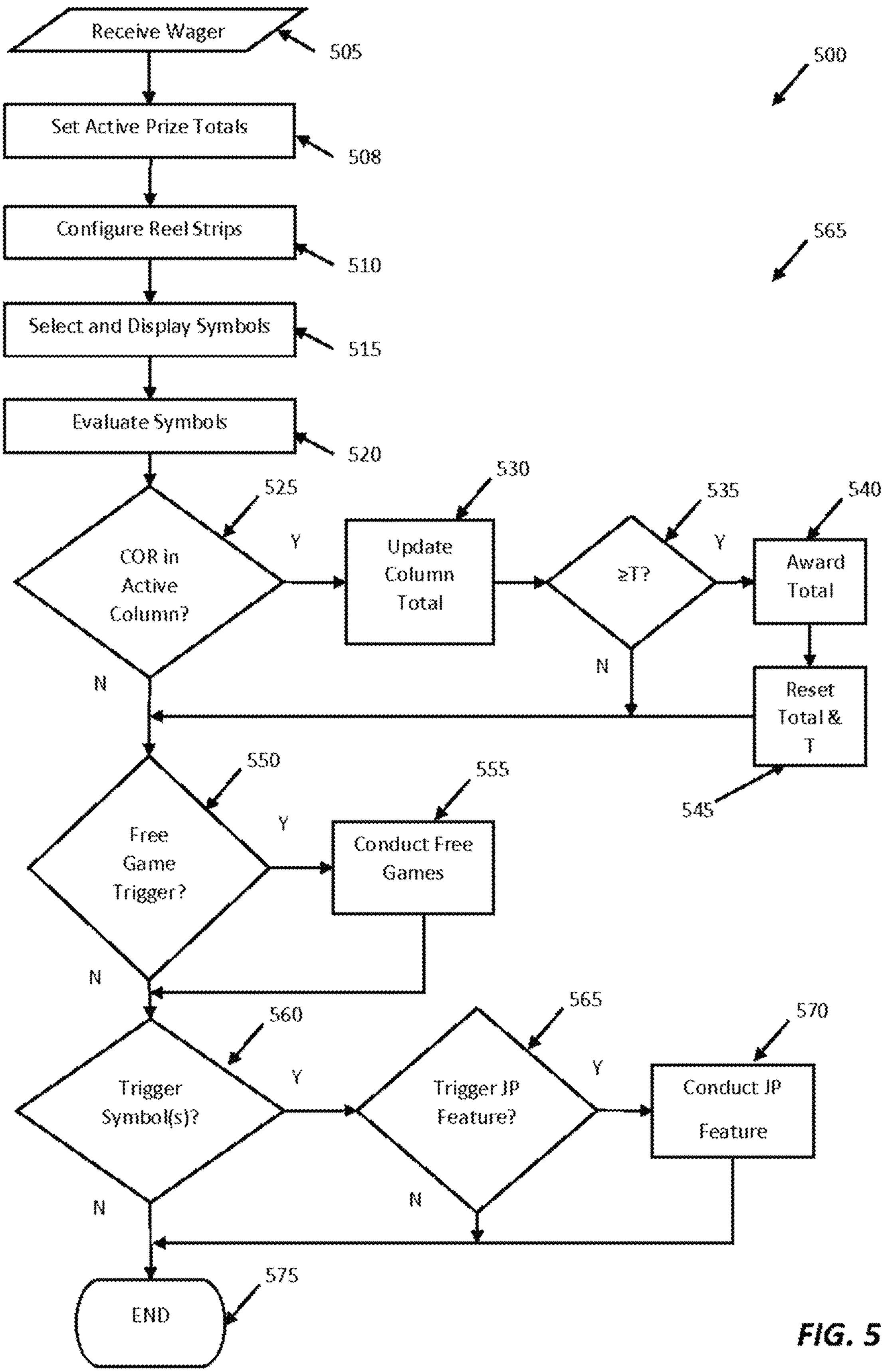
FIG. 5 is a flow chart of a method of operating a gaming device.
Figure 9:
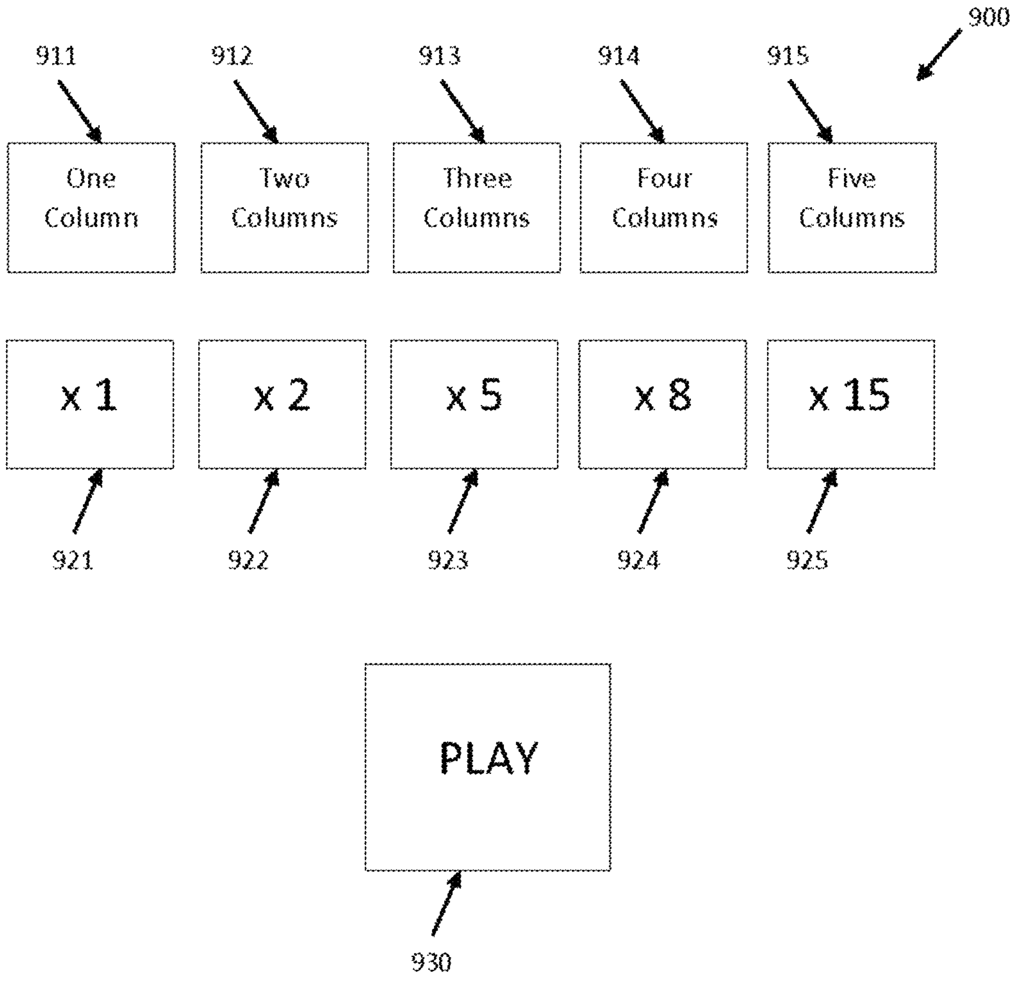
FIG. 9 is a schematic diagram of a button deck.

FIG. 5 is a flow chart of an example embodiment of a method 500 of operating a gaming device to carry out a spinning reel game in which symbols are selected by processor from reel strips defined in memory 2-8 for display at a plurality of columns of symbol positions (often referred to as reels). The processor 204 initiates a first game instance (e.g. a base game) in response to receiving a wager at step 505, (e.g. in response to a player making a wager selection using physical or virtual buttons as described above). In this example, a characteristic of wager selection is for a player to select how many column-specific award totals (or reel jackpots) will be active in this play of the game by making a selection corresponding to the desired number of award totals. FIG. 9 is a schematic diagram 900 of example buttons 911-915 for specifying a wager. In this respect, buttons 911-915 enable a player to select whether award totals are active in one column 911, two columns 912, three columns 913, four columns 914 or five columns 915.

In the example, there are also five bet multiplier buttons 921-925 in order to select a ×1 bet multiplier 921, ×2 bet multiplier 922, ×5 bet multiplier 923, ×8 bet multiplier 924 or a ×15 bet multiplier 925, each of which multiplies a credit amount. In an example, a total credit amount that will be deducted for the selection may be indicated on, or in proximity to the buttons. After the player makes the selection, the button is lit-up (in the case of physical buttons) or the display of a virtual button is modified in order to indicate the current selection. After the player, makes a new selection, the player presses "Play" button 930 and initiate the base game. It will be appreciated that the player need not make such a selection in each play of the game, for example, pressing the "Play" button 930 may use the most recently specified wager.

Figure 8:
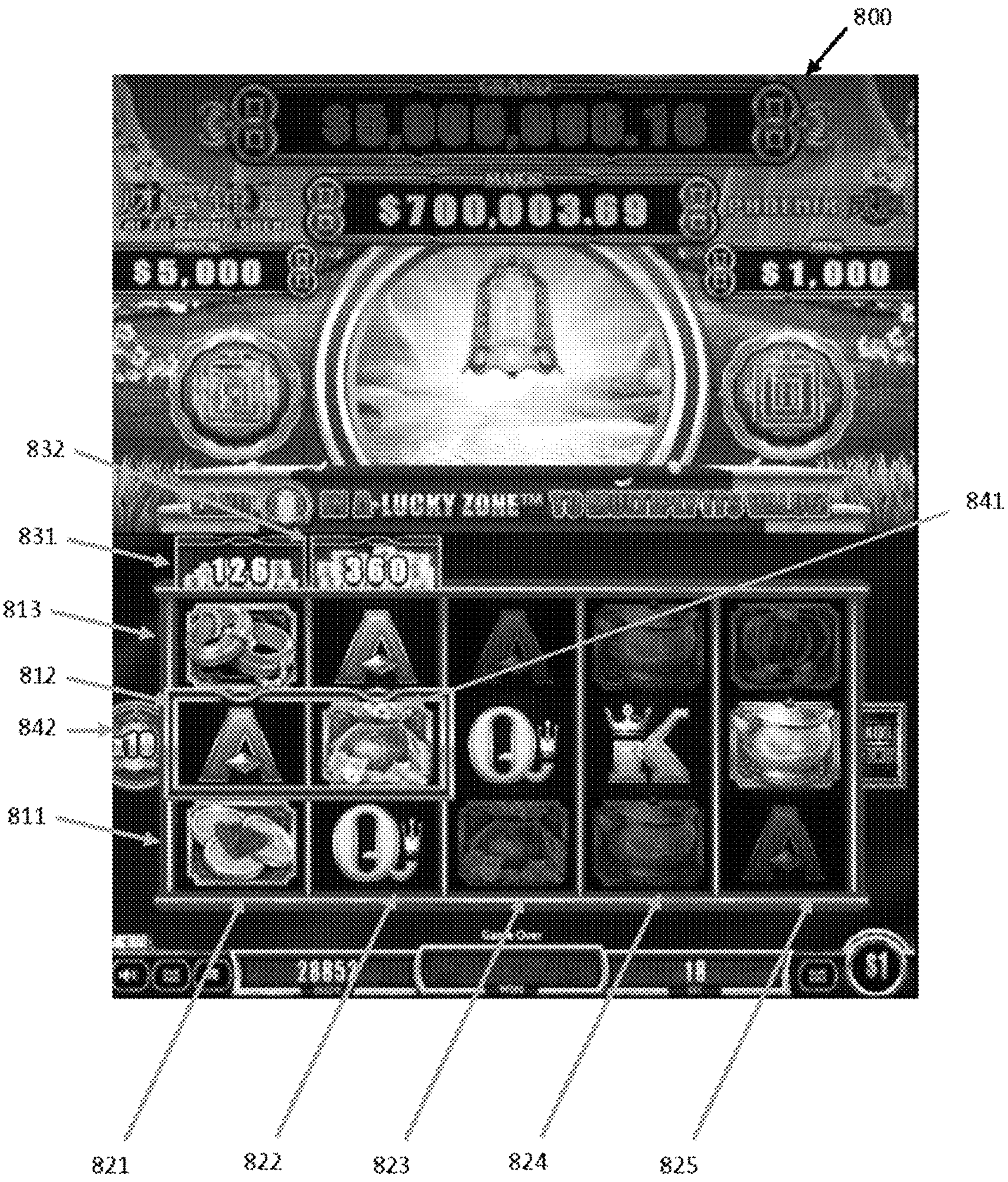
FIG. 8 is an example screen display.

At step 508, processor 204 sets the active award total based on the current wager. FIG. 8 shows an example screen display 800 of a spinning reel game where a selection of a ×2 multiplier has been received at step 505. FIG. 8 shows an example base game where symbols are selected from five configured reel strips for display in five columns of symbol positions 821-825 with three symbols being selected from each reel strip such that there are also three rows 811-813 of symbol positions. It will be appreciated that other embodiments are possible—e.g. four rows of symbols, or some columns with three symbol positions and some columns having four symbol positions.

As two column button 912 has been selected in FIG. 8, at step 508, processor 208 has set two award totals 831, 832 as active, such that example screen display 800 shows current award totals of "126" credits 831, and "360" credits 832 above the first column 821 and second column 822 respectively as they are active for this play of the game. Award totals are not shown above the remaining columns as they are inactive. Additionally, a "Lucky Zone" 841 corresponding to the active columns is indicated by border 841 to indicate that award values falling within this zone will be multiplied (here by a ×10 multiplier) as explained in further detail below.

Figure 10:
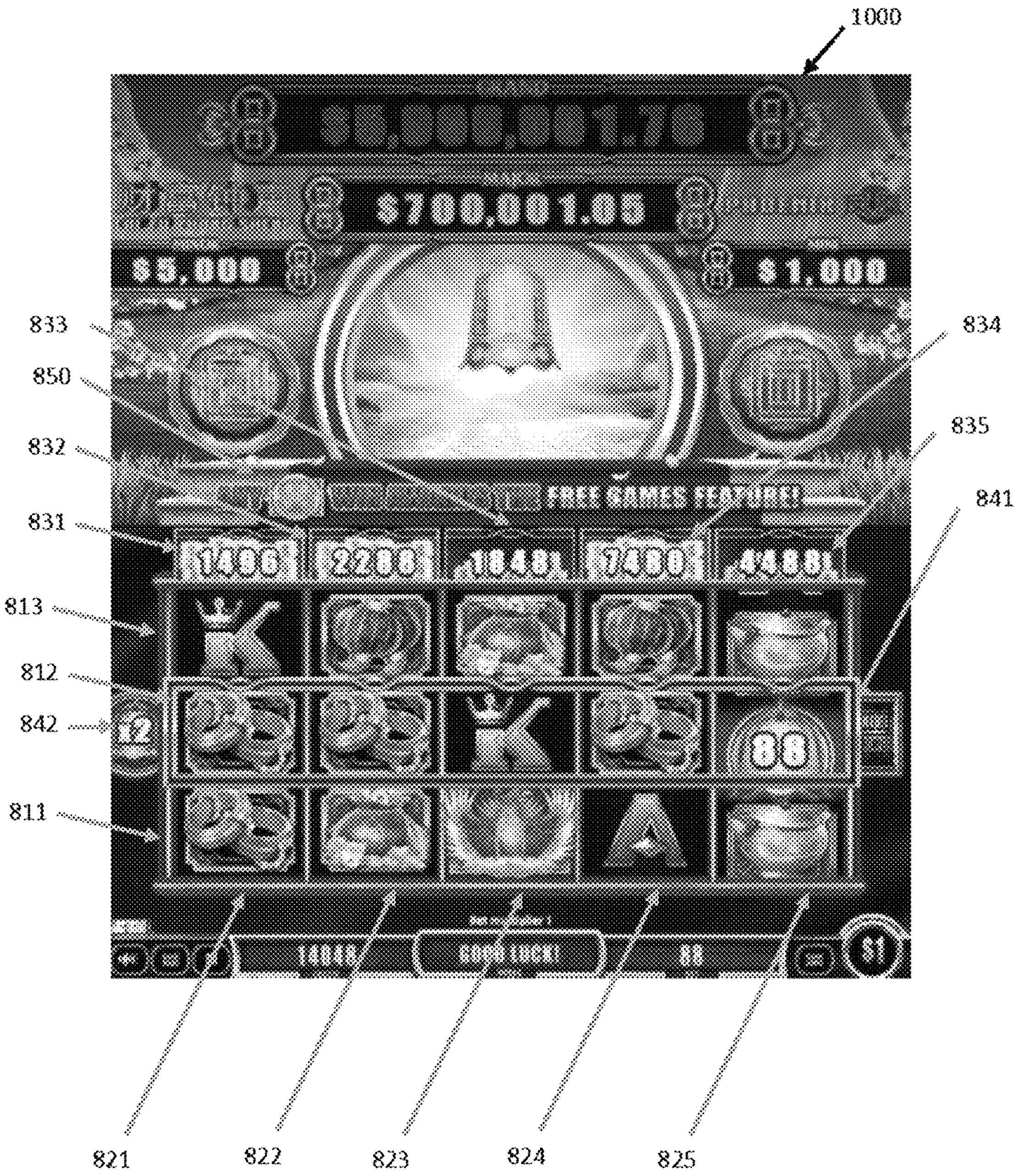
FIGS. 10 to 31 are example screen displays.

FIG. 10 is an example where five columns button 915 has been selected so that five award totals 831-835 are activated by processor 204 at step 508 and displayed above columns 821-825 and border 841 now extends around all five symbol positions of middle row 812 of symbol positions. In the example, the award totals 831-835 are specific to the selected multiplier/number of active award totals such that the award totals will change when the wager is changed. That is, different sets of award totals are maintained in memory 208 for each of the five different wager options 911-915. In this respect, it will be apparent that as different numbers of award totals are available for the different wager options, number of award totals will vary from one for first wager option 911 to five award totals for fifth wager option 915.

At step 510, the processor 204 configures the reel strips for a current game instance, in this respect, FIG. 3 illustrates an example of a set 300 of five reel strips 341, 342, 343, 344, 345. In the example, for illustrative purposes, twenty-five reel strip positions 301-325 are shown for each reel strip 341-345. Each reel strip position of each reel has a symbol. For example, a "Wild" symbol occupies the twenty-first reel strip position 321 of the fourth reel 344. The symbols shown on the reel strip are generally indicative of symbols that may be employed in the embodiments but it will be appreciated that there visual appearance and the composition will depend on factors such as the visual theme of the game and desired return to player. That is, other reels strips to those illustrated in FIG. 3 can be used, for example, reel strips where two or more wild symbols are placed at consecutive reel strip positions of a reel strip. Symbol position 330 indicates that the reel strips 341-345 may have more symbols than illustrated. For example, the reel strips 341-345 could have between 30 and 100 reel strip positions with the last reel strip position of a respective reel strip being treated as contiguous with the first reel strip position 301 as would be the case with a mechanical reel. The actual lengths of the game reel strips depend on factors such as the number of wild symbols (in general, the more wilds there are, the longer the reel strip needs to be to maintain the target RTP), and volatility (in general, the higher the award value is, the longer the reel strip needs to be to lower the hit rate to maintain the target RTP). In some examples, the reel strips associated with different columns may be of different lengths to one another.

In the examples, the reel strips include a plurality of configurable symbol positions, here designated as "COR" (e.g. at the sixth symbol position 306 of the first and second reel strips 341, 342), and these symbol positions are configured at step 510 by processor 204 with configuring symbols as part of each base game instance. That is, in this example, the reel strips are configured for each base game instance.

In this example, processor 204 selects a specific configuring symbol for each configurable symbol positions using RNG 212 and weighted tables. In this example, the configuring symbols each have award value and hence are award value symbols or "cash on reel" ("COR") symbols. In an example, the award values that the COR symbols can take depend on the selected bet multiplier. In another example, the award values that the COR symbols can take are independent of the selected bet multiplier.

At step 515, the processor 204 selects symbols for a spinning reel game using the configured reel strips and controls the display 240 to display the selected symbols.

Figure 4:
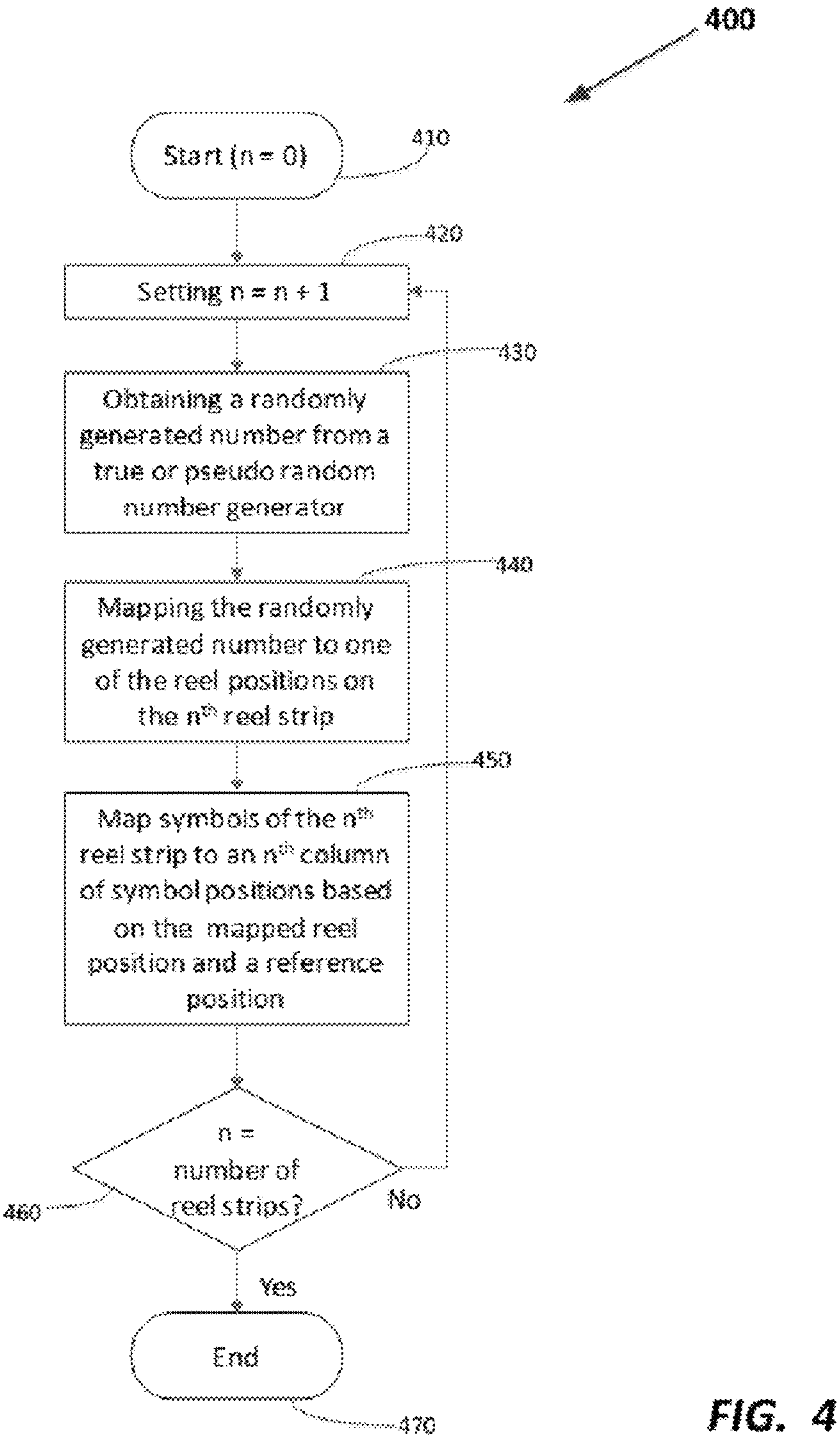
FIG. 4 is a flow chart of a symbol selection method.

FIG. 4 is a flow chart of an example method 400 carried out by the processor 204 to select symbols at step 515 from reel strips configured at step 510. At step 410, the processor 204 starts the process of selecting symbols with a counter (n) set at zero as symbols have not yet been selected from any reel strips. At step 420, the processor 204 increments the counter. In the first iteration, the counter is set to 1 to reflect that symbols are to be selected from a first reel strip. At step 430, the processor obtains a randomly generated number from a true or pseudo random number generator 212. At step 440 the processor maps the generated number to one of the reel positions of the nth reel strip. In the first iteration, this is the first reel strip. To map the generated number to one of the reel positions, the possible values that can be returned from the RNG 212 are divided into ranges and associated with specific ones of the reel positions in memory 208. In one example, these ranges are stored as a look-up table. In one example, the ranges are each the same size so that each of the reel strip positions has the same chance of been selected. In other examples, the ranges may be arranged to weight the relative chances of selecting specific reel strip positions.

At step 450, the processor 204 maps symbols of the nth reel strip to and nth column of symbol display positions based on the mapped reel position and a reference position. In an example, the reference position is the bottom position of the symbol positions of each column of symbol positions. In this example, the selected reel position (and hence the symbol at this position) is mapped to the bottom symbol position of the column. Referring to the example reel strips of FIG. 3, if the value returned by the RNG 212 is mapped to reel position 313 when three symbols are being selected from each reel, then for the first reel strip 341, "10" is mapped to a bottom symbol position in bottom row 811, "PIC3" symbol is mapped to a middle symbol position in middle row 812, and "A" symbol is mapped to a top symbol position in top row 813.

At step 460, the processor 460 determines whether symbols have been selected for all of the reel strips, and if not the processor 204 reverts to step 420 and iterates through steps 430, 440 and 450 until it is determined at step 460 that symbols have been selected from all n reel strips and mapped to all n columns of symbol positions after which the symbol selection process ends 470. Different numbers of symbols may be mapped to different numbers of symbol positions.

After the symbols of all reel strips have been mapped to symbol position, the processor 204 controls display 240 to display them at the symbol positions as shown in FIG. 8.

After the symbols are selected, at step 520, the processor 204 evaluates the selected symbols for one or more winning combinations based on a pay table stored in memory 208. In this example, processor 204 applies a ways to win or "Reel Power" evaluation by processing the selected symbols to identify instances of the same symbol appearing in consecutive columns starting from the left most column 821. Upon there being one or more winning combinations, the processor 204 makes an award, for example, by adding credit amounts defined by the pay table based on the amount wagered to a win meter or a credit meter in memory 208.

Figure 11:
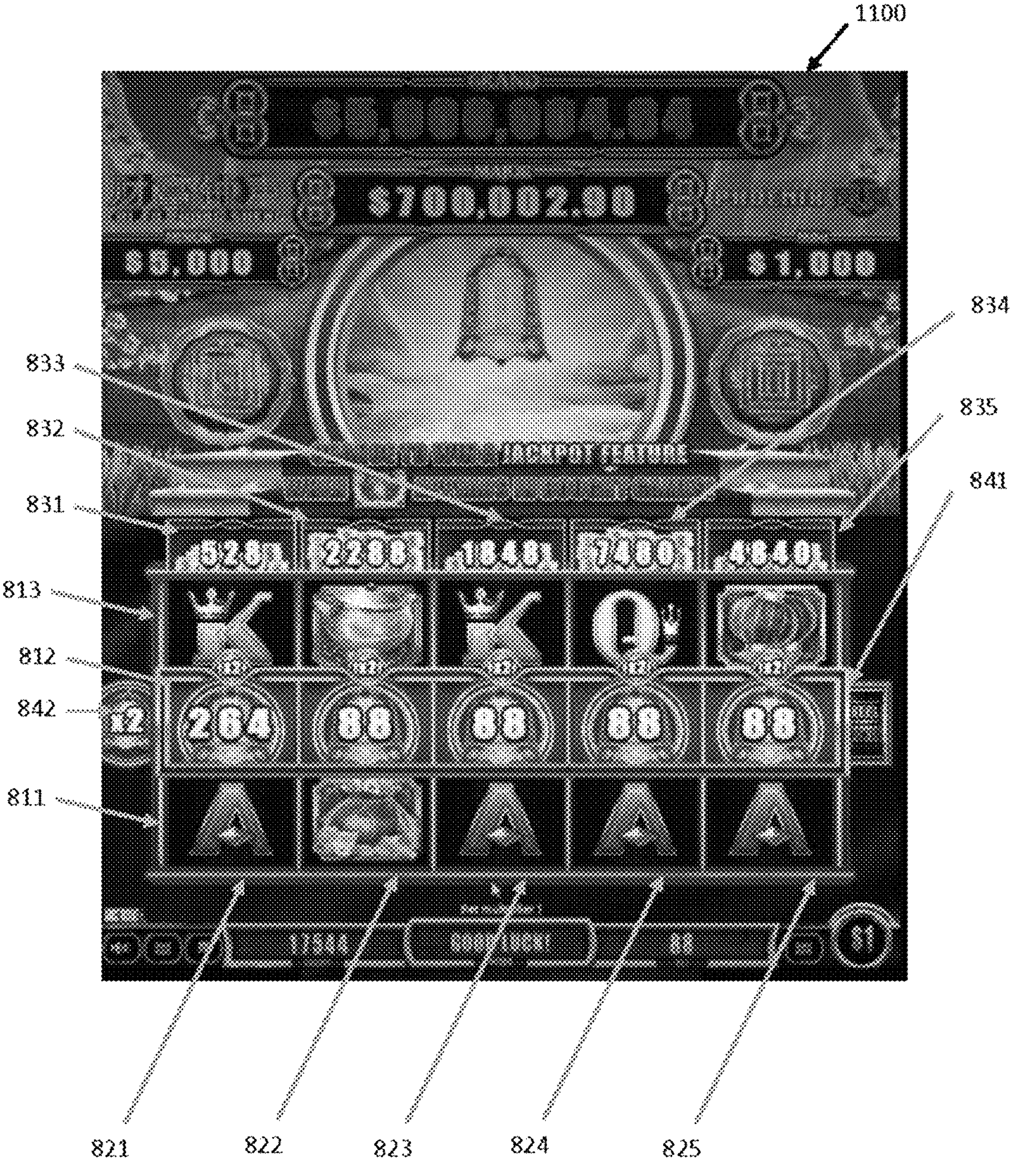
Figure 12:
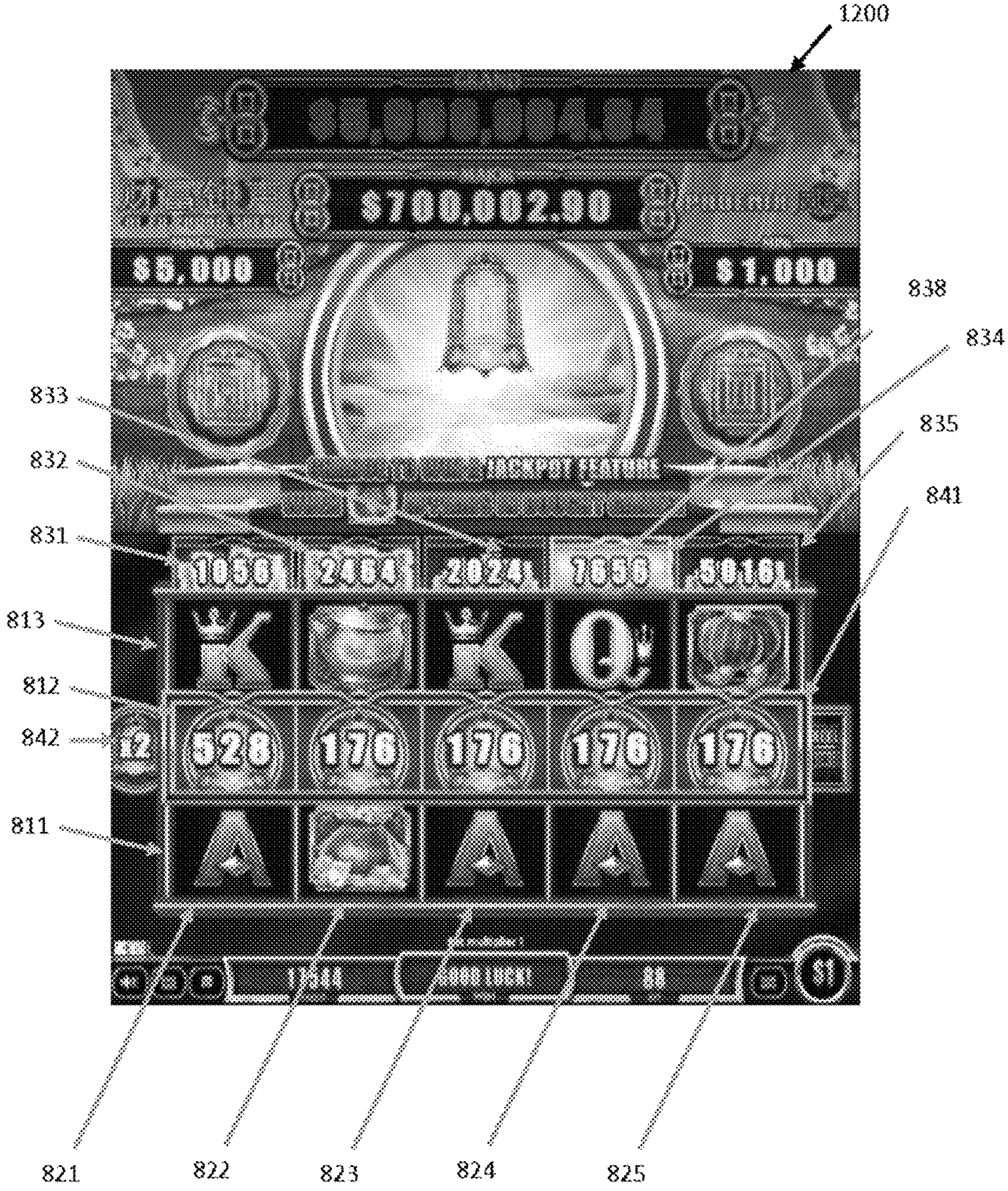

At step 525, processor 204 determines whether the selected symbols include one or more COR symbols in a column (on a reel) where there is an active award total, and if processor 204 makes a positive determination, processor 204 proceeds to step 530 and updates the award total for the respective column in memory 208 and on the display 240. In this respect, FIGS. 11 and 12 are example screen displays 1100, 1200 that illustrate the processor 204 updating award totals. FIGS. 11 and 12 are examples where first to fifth award totals 831-835 are active and associated with respective ones of first to fifth columns 821-825 of symbol positions. FIG. 11 shows an example where symbols have been selected but processor 204 has yet to update the current award totals 831-835. At this moment, first current award total 831 is 528 credits, second current award total 832 is 2288 credits, third current award total 833 is 1848 credits, fourth current award total 834 is 7480 credits, and fifth current award total is 4840 credits.

Example screen display 1100 shows an example where COR symbols have been selected by processor 204 for all symbol positions of middle row 812 of symbol positions such that each of the COR symbols is within "Lucky Zone" 841 and processor 204 will make a positive determination at step 525. From left to right, the values on the COR symbols as selected are 264, 88, 88, 88, and 88 credits. At step 530 processor 204 updates the award totals 831-835 of each column. In this respect, for any COR symbol landing in the "Lucky Zone" 841, the update process performed by processor 204 includes multiplying the face value of the relevant COR symbol by the current multiplier value 842, in this example a ×2 multiplier, before adding to the current total and updating the relevant values in memory 208 and on the display 240.

FIG. 12 is an example screen display 1200 following the update process 530. The COR symbol landing in the first column 821 has been multiplied by two and changed to 528 credits and added to the previous total of 528 credits so that first column award total 831 is updated to 1056 credits. The same process is applied in each of the other columns so that:

in second column 822, 88 credit COR symbol is multiplied by two to be 176 credits, and the second column award total 832 is updated to 2464 credits; in third column 823, 88 credit COR symbol is multiplied by two to be 176 credits, and the third column award total 833 is updated to 2024 credits; in fourth column 824, 88 credit COR symbol is multiplied by two to be 176 credits, and the fourth column award total 834 is updated to 7656 credits; and in fifth column 825, 88 credit COR symbol is multiplied by two to be 176 credits, and the fifth column award total 835 is updated to 5016 credits.

At step 535, processor 204 determines whether the updated award value of one or more updated award totals has reached or exceeded a award threshold (T) for the specific column (and bet selection). FIG. 12 shows an example where processor has made a positive determination at step 535 with respect to the fourth column award total 834 and modified the background 838 of fourth column award total 834 to indicate that the award total will be awarded. It will be appreciated that for the award to be awarded in this example, the threshold (T) must be greater than 7480 credits and no more than 7656 credits. At step 540, processor 204 makes the award, for example, by adding the value of 7656 credits to one of a credit or win meter in memory 208. Then, at step 545 processor 204 resets the total award and the threshold (T) for the fourth column. In an example, the total is reset to zero. In an example, the new threshold is selected by processor 204 using RNG 212 to be in a range defined by upper and lower award bounds. In this way, the threshold value will vary from column to column and be unpredictable.

Figure 13:
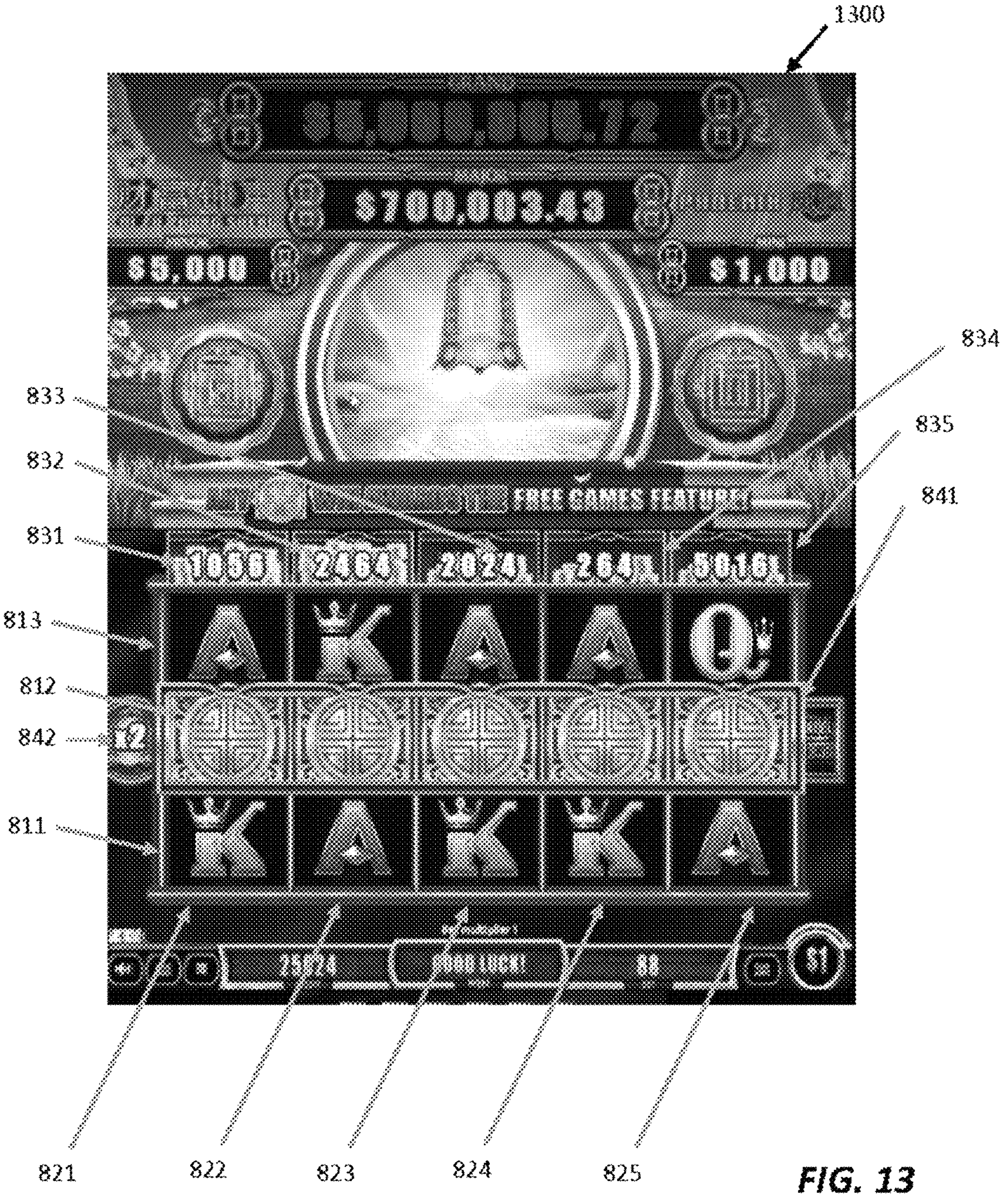

At step 550, the processor 204 determines whether a free game trigger is met. As indicated by game message 850 in FIG. 10, in this example, the free game "Any [Gong symbol] win awards the free games feature!"—that is, designated winning outcomes involving a designated symbol will trigger the free games. FIG. 13 shows an example of a designated winning outcome, here five-of-a kind Gong symbols in the center row 812 such that processor 204 will proceed to step 565 and conduct the free games as shown in more detail in FIG. 7.

Figure 14:
Figure 15:

FIGS. 14 and 15 are example transitional display screen displays 1400, 1500 in which the player makes a selection affecting how the free games will be conducted. Specifically, as shown in FIG. 14, virtual buttons 1401, 1402 enable player to choose between a first game play option where the player will receive "8 Free games, Lucky Zone ×3 or ×10" 1401 (i.e. 8 games with either a ×3 or ×10 multiplier for COR symbols selected at one of the defined symbol positions of the Lucky Zone), and a second game play option where the player will receive "5 Free games, Lucky Zone ×10". In this example, second game play option button 1402 is greyed-out to indicated that the gaming device 200 has received a selection of the first game play option button 1401 via a touch input on display 240.

Figure 7:
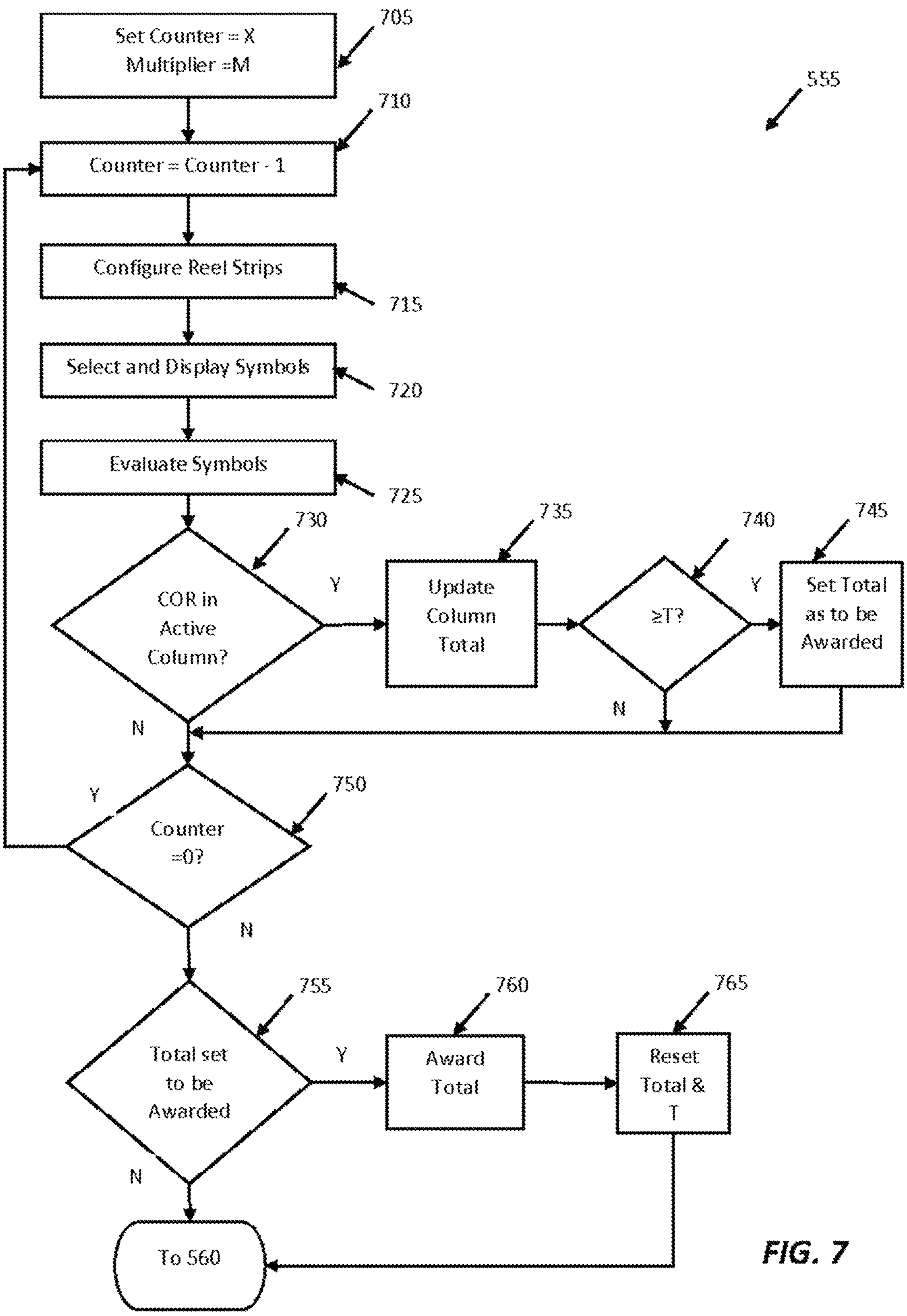
FIG. 7 is another flow chart of a method of operating a gaming device.

As shown in FIG. 7, when conducting 555 the free games, at step 705, processor 204 sets a counter (X) and multiplier (M) to apply for the free games. Where player, selects first game play option, the setting process 705 involves setting the counter to 8 (reflecting 8 free games) and making a random determination using RNG 212 and a weighted table in memory 208 as to which multiplier (×3 or ×10) will be applied to and COR values selected within the Lucky Zone 841. Updated game play option button 1401A in the example screen display 1500 of FIG. 15, shows an example where processor 204 has determined using RNG 212 that a ×3 multiplier will apply.

At step 710, processor 204 decrements the counter by one to reflect that one of the free games is being consumed. At step 715, processor 204 configures the reel strips using the process outlined at step 510 above. Then, at step 720 and 725, processor 204 selects symbols, displays the selected symbols and evaluates them for winning combinations using the processes described in relation to steps 515 and 520 above.

At step 730, processor 204 determines whether the selected symbols include one or more COR symbols in a column (on a reel) where there is an active award total, and if processor 204 makes a positive determination, processor 204 proceeds to step 735 and updates the award total for the respective column in memory 208 and on the display 240 using the process described above in relation to step 530 above before determining whether one or more award thresholds have been exceeded at step 740. In this respect, FIG. 16 is an example screen displays 1600 where five award totals 831-835 are active and two COR symbols have been selected by processor 204 in the first column with one COR symbol in the middle row so that it is within "Lucky Zone" 841 and one COR symbol in the bottom row.

Figure 16:
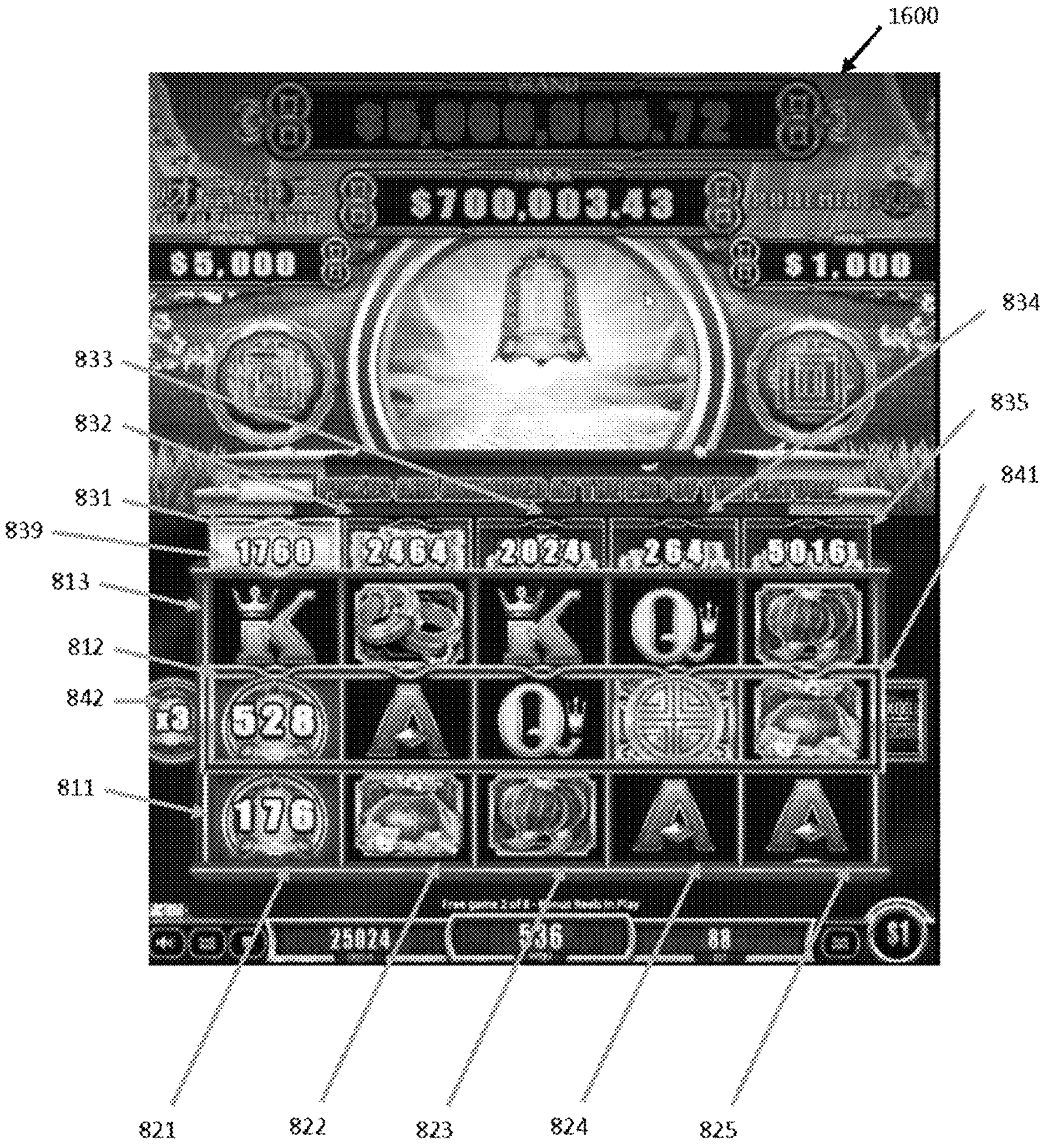

In the example, of FIG. 16, the COR symbol landing in the middle row 812 of first column 821 originally had the award value of 176 credits so that is has been changed to 528 credits (i.e. multiplied by three). The COR symbol landing in the bottom row 811 of first column 821 retains the original value of 176 credits. Both credit values have been added to the previous award total resulting in first column award total 831 being updated to 1760 credits. Further, in this example, processor 204 has made a positive determination that the updated award value of updated award total 831 has reached or exceeded the award threshold (T) for the first column (and bet selection) and modified the background 839 of first column award total 831 to indicate that the award total will be awarded. Following step 740, the process implemented by processor 204 as part of conducting the free games diverges from that implemented by processor 204 during base games. In this respect, at step 745 rather than awarding the award total immediately, the processor 204 sets the relevant award total (here the first award total) to be awarded at the conclusion of the free game instances. Advantageously, this enables any awarded award total to be incremented further during the balance of the feature games upon further COR symbols being selected in the relevant column such that there is a potential for a larger award total to be awarded at the conclusion of the free games.

In this respect, at step 750 processor 204 determines whether the counter has reached zero (i.e. whether all free games have been conducted), and if not returns to step 710 and iterates through at least steps 710-730 and steps 735-745 where a COR symbol is selected in a subsequent free game instance. In this respect, FIG. 17 shows an example where first column award total is updated during subsequent free game instances so that in example screen display 1700, first award total has reached 3344 credits by the eighth and final game instance.

Figure 17:
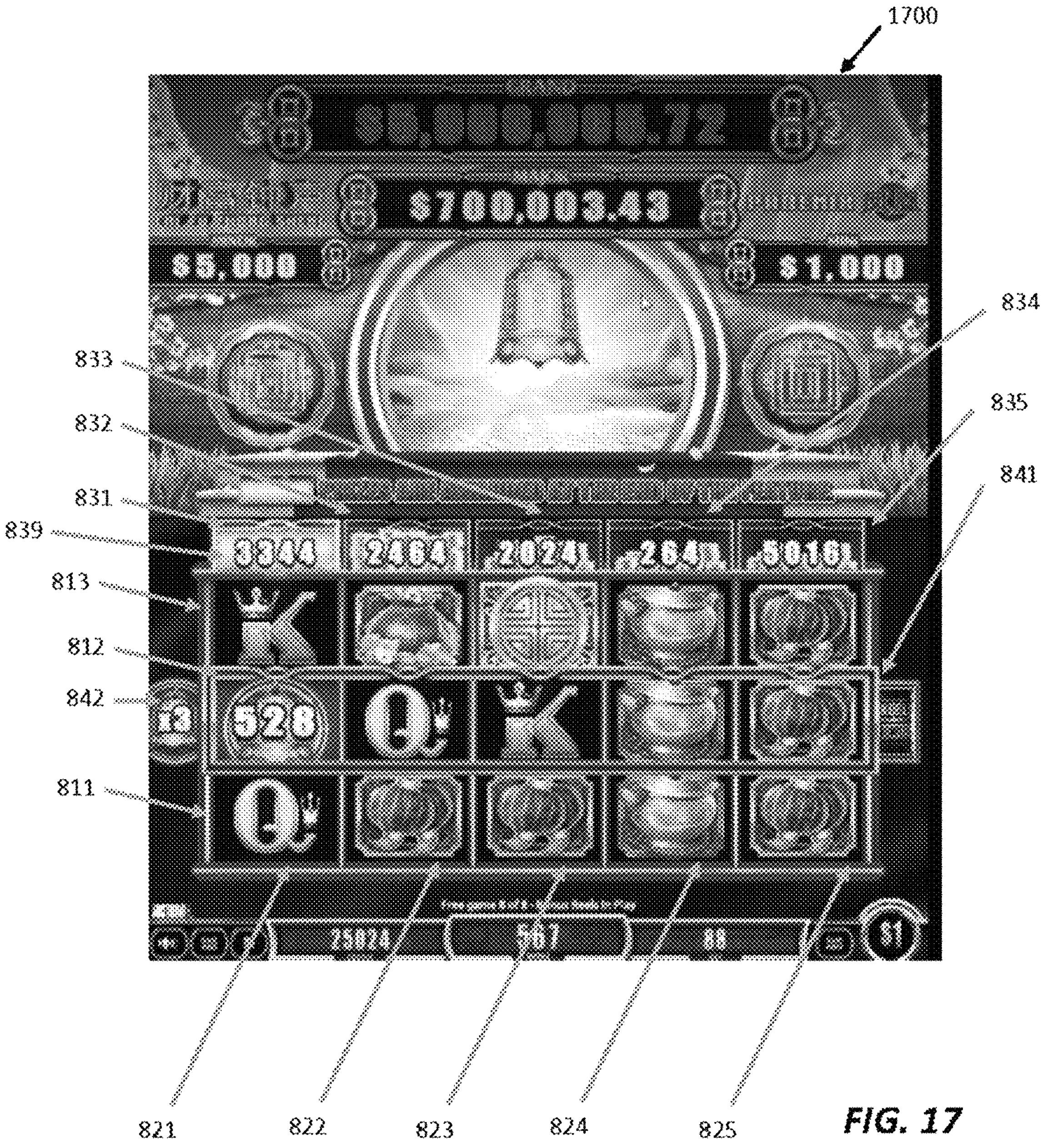

At step 755, processor 204 determines whether it has previously set a award total to be awarded which will be the case in the example of FIGS. 16 and 17. Upon making a positive determination, processor 204 makes the award of the first award total at step 760, for example, by adding the value of 3344 credits to one a credit or win meter in memory 208 which is 1584 credits more than the value of the first award total when the processor 204 made a determination to award the first award total.

Then, at step 765 processor 204 resets the total award and the threshold (T) for the first column. In an example, the total is reset to zero. In an example, the new threshold is selected by processor 204 using RNG 212 to be in a range defined by upper and lower award bounds.

Figure 18:
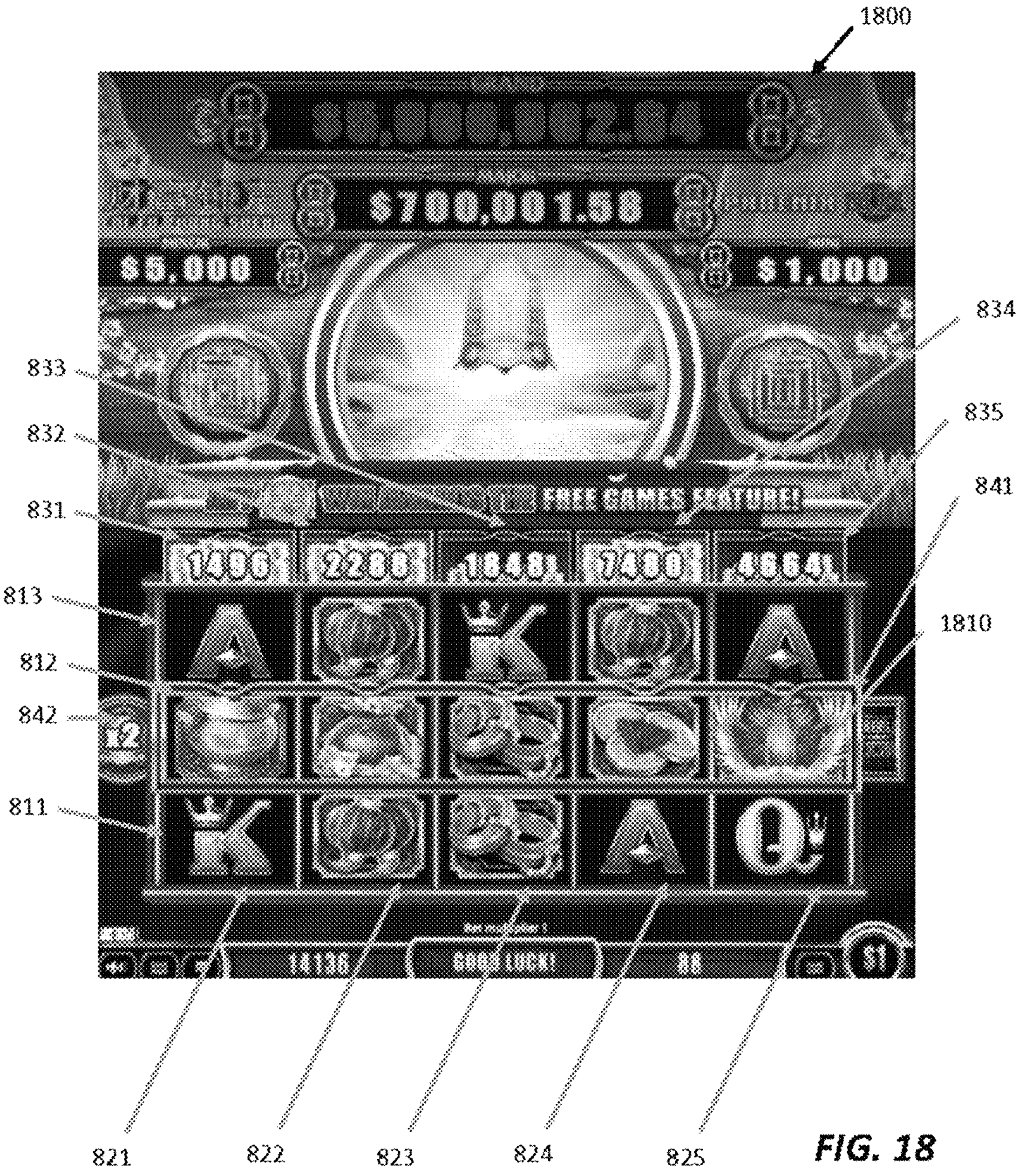

Processor 204 then proceeds to step 560 and determines whether the selected symbols include one or more jackpot trigger symbols. FIG. 18 is an example screen display 1800 where a jackpot trigger symbol 1810 (here a Phoenix symbol) has been selected. Accordingly, processor 204 will make a positive determination at step 560 and proceed to step 565 and determined whether to trigger the jackpot feature, in this example, by conducting a random determination using RNG 212 to determine whether the jackpot feature is to be triggered based on probability defined in memory. The probability may be set, for example, based on how many trigger symbols are on the reel strips (and hence how often they will be selected), and how often the jackpot is to be triggered in order to provide a portion of the overall return to player from the jackpot feature.

Figure 6:
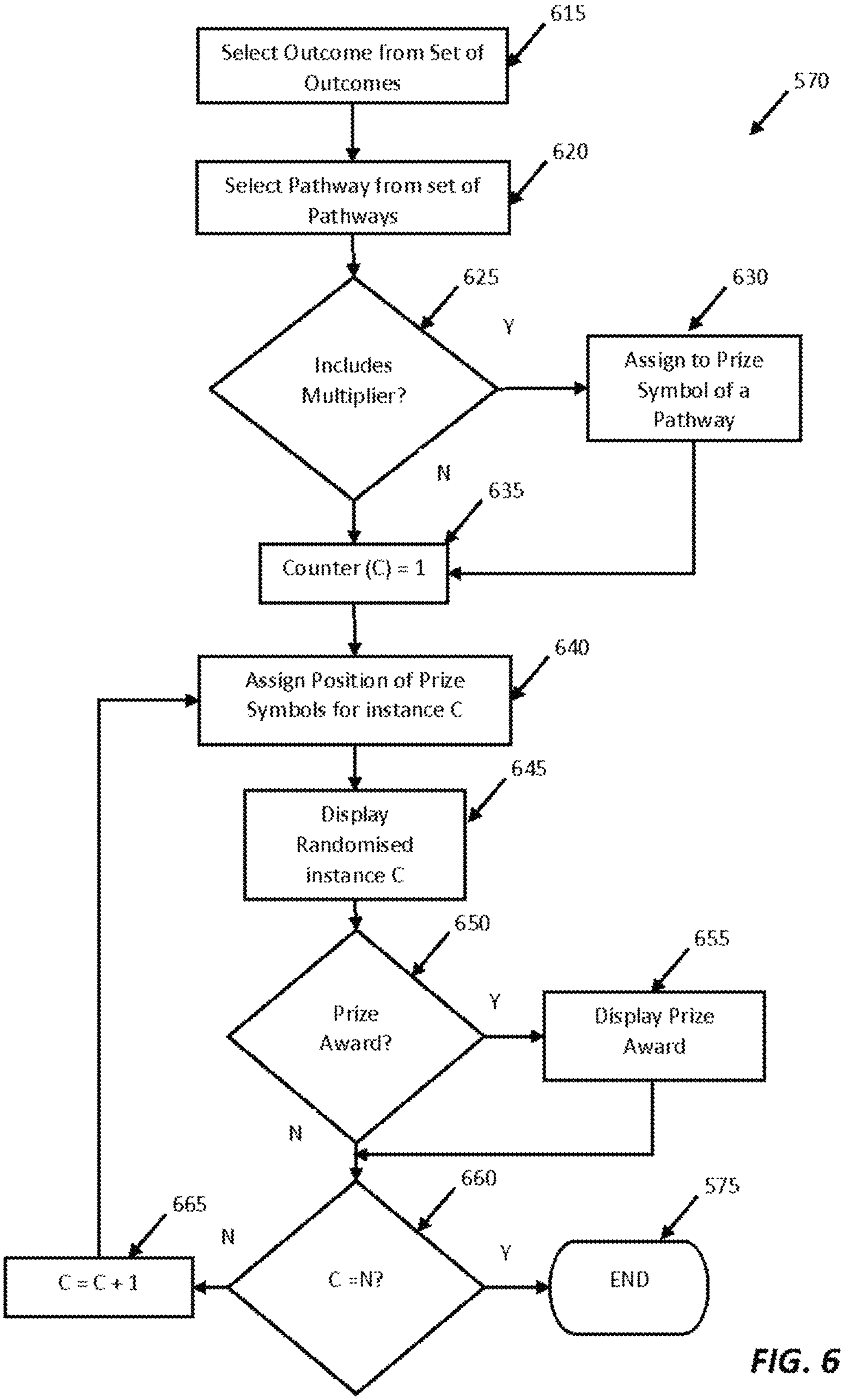
FIG. 6 is another flow chart of a method of operating a gaming device.
Figure 19:

Upon making a positive determination at step 565, processor 204 proceeds to step 570 and conducts the jackpot feature as shown in more detail in FIG. 6. FIG. 19 is an example transitional display screen 1900 showing a game message 1901 that indicates to the player that the jackpot feature has been awarded and possible winning outcomes of the jackpot feature. Specifically, game message 1901 says: "Jackpot Feature Won! Collect 5 [Grand symbol], [Major symbol], [Minor symbol] or [Mini symbol] to Win".

At step 615, processor 204 selects an outcome from a set of available outcomes of the jackpot feature that are defined in memory 208 using a weighted table—i.e. a probability weighting is associated with each outcome. Table 1 shows an example set of outcomes.

TABLE 1

| Outcomes |
|---|
| Grand |
| Major |
| Minor |
| Mini |
| Grand, Minor |
| Grand, Mini |
| Major, Minor |
| Major, Mini |
| Minor, Mini |
| Grand, Minor, Mini |
| Major, Minor, Mini |
| Minor × 2 |
| Minor × 3 |
| Mini × 2 |
| Mini × 3 |
| Minor × 2, Mini × 2 |
| Minor × 3, Mini × 3 |

In this example, each outcome defines one or more awards that will be awarded from the jackpot feature, e.g. a "Grand" jackpot award (the largest available award, a "Major" jackpot award, a "Minor" bonus award, and a "Mini" bonus award. In some outcomes, more than one award is awarded, e.g. both a Minor and Mini bonus award. In some outcomes, a multiplier is applied to one or more awards. For example, a "Mini ×2" outcome involves awarding a two times multiple of the Mini bonus award.

After selecting the outcome, at step 620, the processor 204 selects a pathway from a set of pathways. Example pathways are set out in Table 2.

TABLE 2

| Pathway | Award symbol definitions for selected outcome (e.g. Mini × 2) |
|---|---|
| 1 | 04221, 40110, 10030, 40044, 02023 |
| 2 | 41000, 40304, 04343, 00022, 30200 |
| 3 | 12400, 03343, 21040, 04142, 02001 |
| 4 | 04301, 10142, 02400, 34010, 43320 |
| 5 | 34000, 24002, 30104, 12401, 00243 |
| 6 | 00220, 44010, 30404, 31400, 01133 |
| 7 | 24200, 00403, 31041, 01104, 42023 |
| 8 | 30240, 13400, 04040, 02110, 02243 |
| 9 | 32011, 03100, 01044, 40220, 33440 |
| 10 | 04400, 00302, 43204, 20400, 20130 |

In this example, ten different pathways are given and all are for the award of a Mini bonus award with a ×2 multiplier. However, more pathways may be employed to increase the degree of randomness in the displayed outcome as described in detail below. In this example, each outcome involves displaying five spinning reel game instances. In Table 2, each of the five, five number numerical strings specifies what symbols will be displayed in the relevant game outcomes, with each number from 0-4 encoding a specific award symbol or no award symbol being displayed in particular column. Specifically, a "1" corresponds to a "Grand" symbol, a "2" corresponds to a "Major" symbol, a "3" corresponds to a "Minor" symbol, a "4" corresponds to a "Mini" symbol, and "0" corresponds to no symbol. For example, for the third pathway, the phrase "12400" will result in a "Mini" symbol being displayed in the first column 821, a "Minor" symbol being displayed in the second column 822, a "Grand" symbol being displayed in the third column 823, and no award symbols being displayed in fourth column 824 or fifth column 825. Accordingly, it will be observed, for example, that if the third pathway is chosen, five "Mini" symbols will be displayed by the end of the fourth spinning reel game instance whereas if the fourth pathway is chosen five "Mini" symbols will not be displayed until the end of the fifth spinning reel game instance. That is, the same outcome will be achieved via alternative pathways. As a result, the representation of the outcome on the display 240 has a certain degree of randomness, even though the outcome has already been determined (randomly).

In order to increase the randomness of the representation of the outcome, at step 625, the processor 204 determines whether the outcome includes a multiplier, and upon making a positive determination proceeds to step 630 and randomly assigns the multiplier to one of the award symbols of the pathway. For example, assuming the third path is chosen, one "Mini" symbol is displayed in each of the first to third game instances, and two "Mini" symbols are displayed un the fourth game instance, and processor 204 will assign the multiplier to one of these symbols at random using RNG 212 and cause the multiplier to be displayed when the relevant symbol is displayed.

At step 635, processor 204 sets a counter (C) to 1 to reflect that the first spinning reel game instance is to be displayed. Then, at step 640, in order to increase the randomness of the representation of the outcome further, the processor 204 uses RNG 212 to randomly select for each award symbol of the game instance, a position within the column at which it will be displayed. In this respect, a potential disadvantage of using the pathways described above is that the player may perceive patterns and believe the game is not truly random (despite the game outcome being chosen at random). Randomizing the position at which award symbols are displayed (and which award symbol displays any multiplier) mitigates that risk and allows a smaller set of pathways to be stored (reducing memory requirements) while giving greater appearance of randomness.

At step 645, the processor 204 controls the display 240 to display the randomized version of the game instance corresponding to the current value of the counter (C). At step 650, processor 204 determines whether the current game instance results in award of a award and, upon making a positive determination, proceed to step 655 and controls display 240 to display the award. In this example, this will be award of the Mini ×2 award in the fourth game instance.

At step 660, the processor determines whether the counter (C) has reached the number of games instances (N) of the pathway (in this example, N=5) and if not increments the counter (C) at step 665 before reverting to step 640. When processor 204 determines at step 660 that all of the game instances have been conducted, the processor 204 ends 575 the game.

In this respect, FIGS. 20 to 26 show an example of the processor 204 controlling display 240 to display a set of game instances of a selected pathway, in this example, a pathway for awarding a ×2 Mini bonus award.

Figure 20:
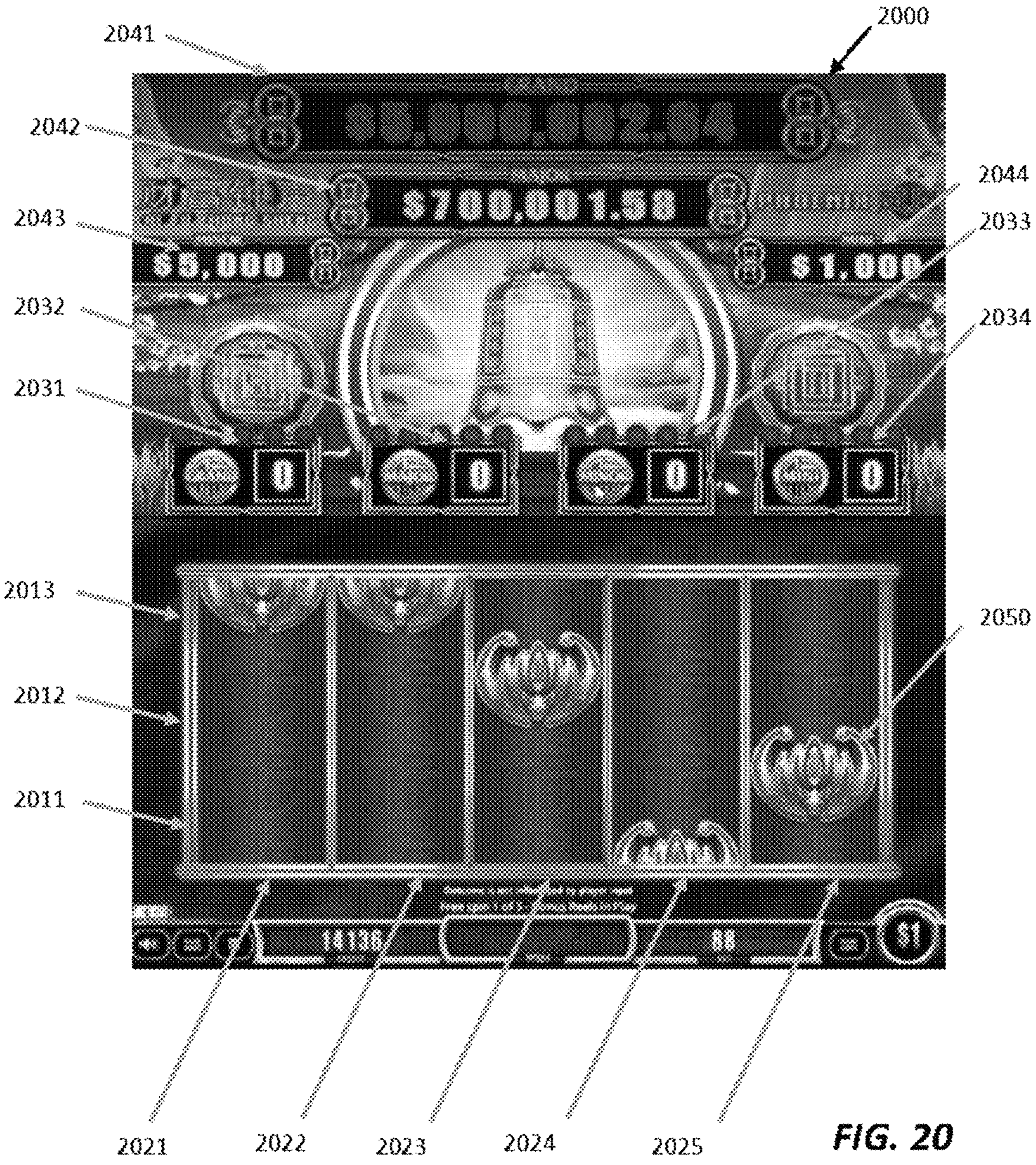

FIG. 20 shows an example display screen 2000 of the jackpot feature as the reels are being animated as spinning under control of the processor 204. As in the base game, there are five columns 2021-2025 of symbol positions each having three symbol positions so that there are also three rows of symbol positions 2011-2013. While the virtual reels are animated as spinning, placeholder symbols 2050 are displayed as moving relative to the symbol positions. When the virtual reels are animated by processor 204 as spinning to a stop, the placeholder symbols are changed by processor 204 into award symbols. Screen display 2000 also has award indicator graphics 2041-2044 that show the current values of the awards that can be awarded from the jackpot award, in this example, a Grand Jackpot award indicator 2041, Major Jackpot award indicator 2042, Minor Bonus award indicator 2043 and Mini Bonus award indicator 2044. There are also progress indicator graphics 2031-2034 that indicate progress towards the award of the awards, in this example, Grand Jackpot progress indicator 2041, Major Jackpot progress indicator 2032, Minor Bonus progress indicator 2033 and Mini Bonus progress indicator 2034.

Figure 21:
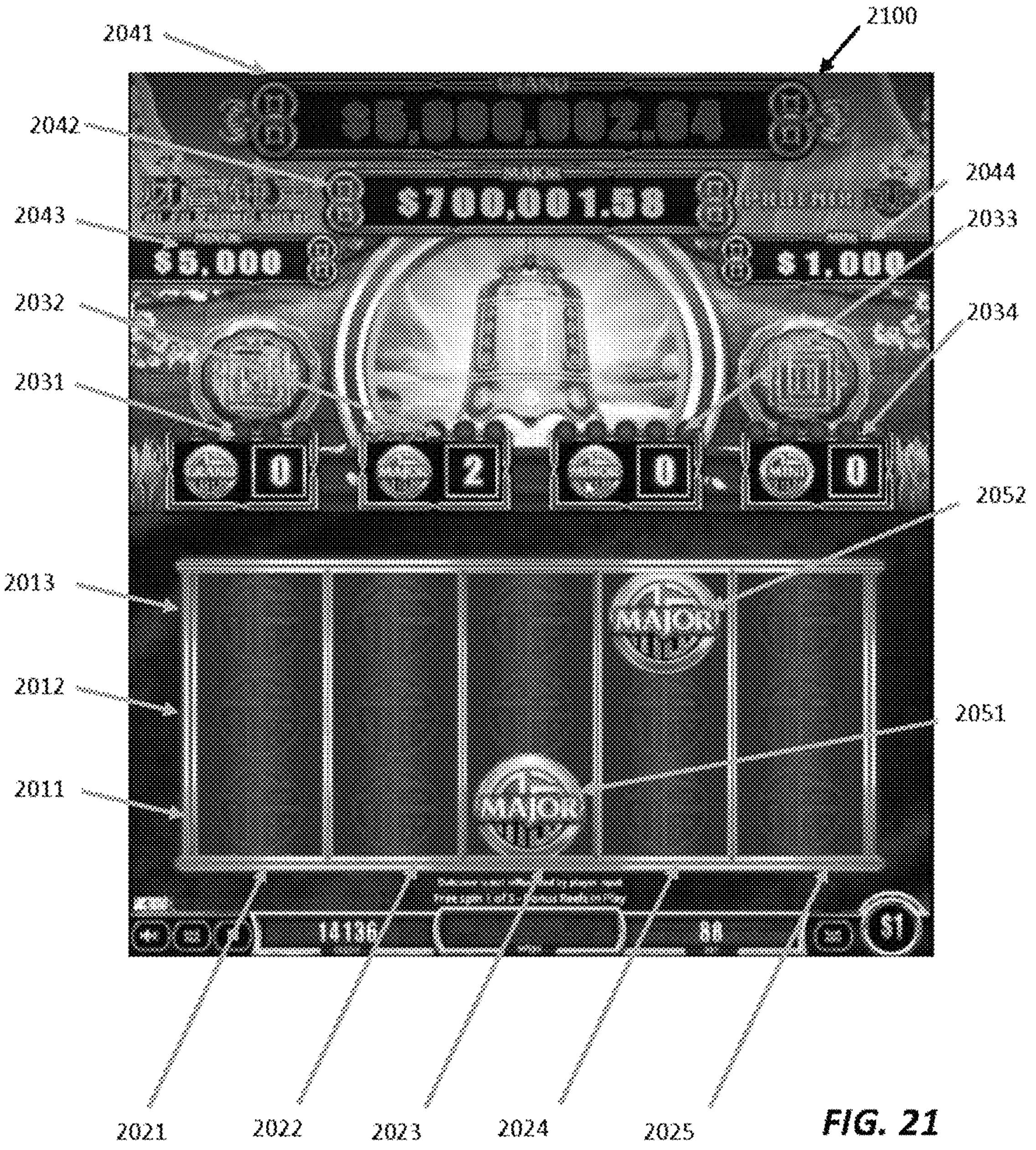

FIG. 21 is an example screen display 2100 at the conclusion of the first game instance. In this example, first game instance includes the display of a first Major award symbol and a second Major award symbol. Accordingly, processor 204 has updated Major Jackpot progress indicator 2032 to show that two Major award symbols have been collected. In this example, processor 204 has used RNG 212 to randomly select the bottom symbol position of the third column 2023 to be occupied by first Major award symbol 2051 and the top symbol position of the fourth column 2024 to be occupied by second Major award symbol 2052.

Figure 22:
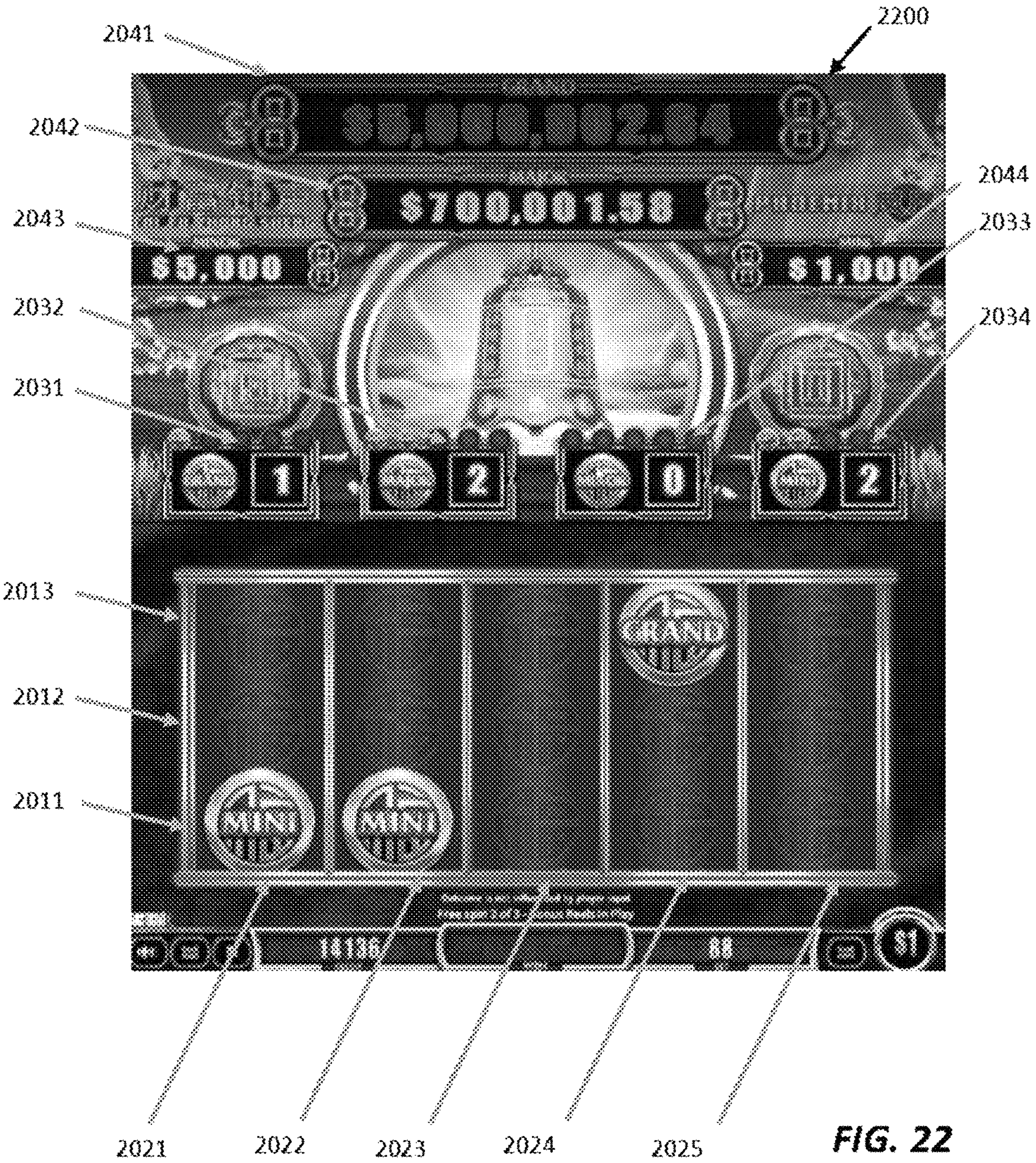

FIG. 22 is an example screen display 2200 of a second game instance, in which two Mini award symbols (first and second columns, bottom row) and a Grand symbol (fourth column, top row) are displayed. Processor 204 has updated Grand award indicator 2031 and Mini award indicator 2034 to reflect the displayed symbols.

Figure 23:
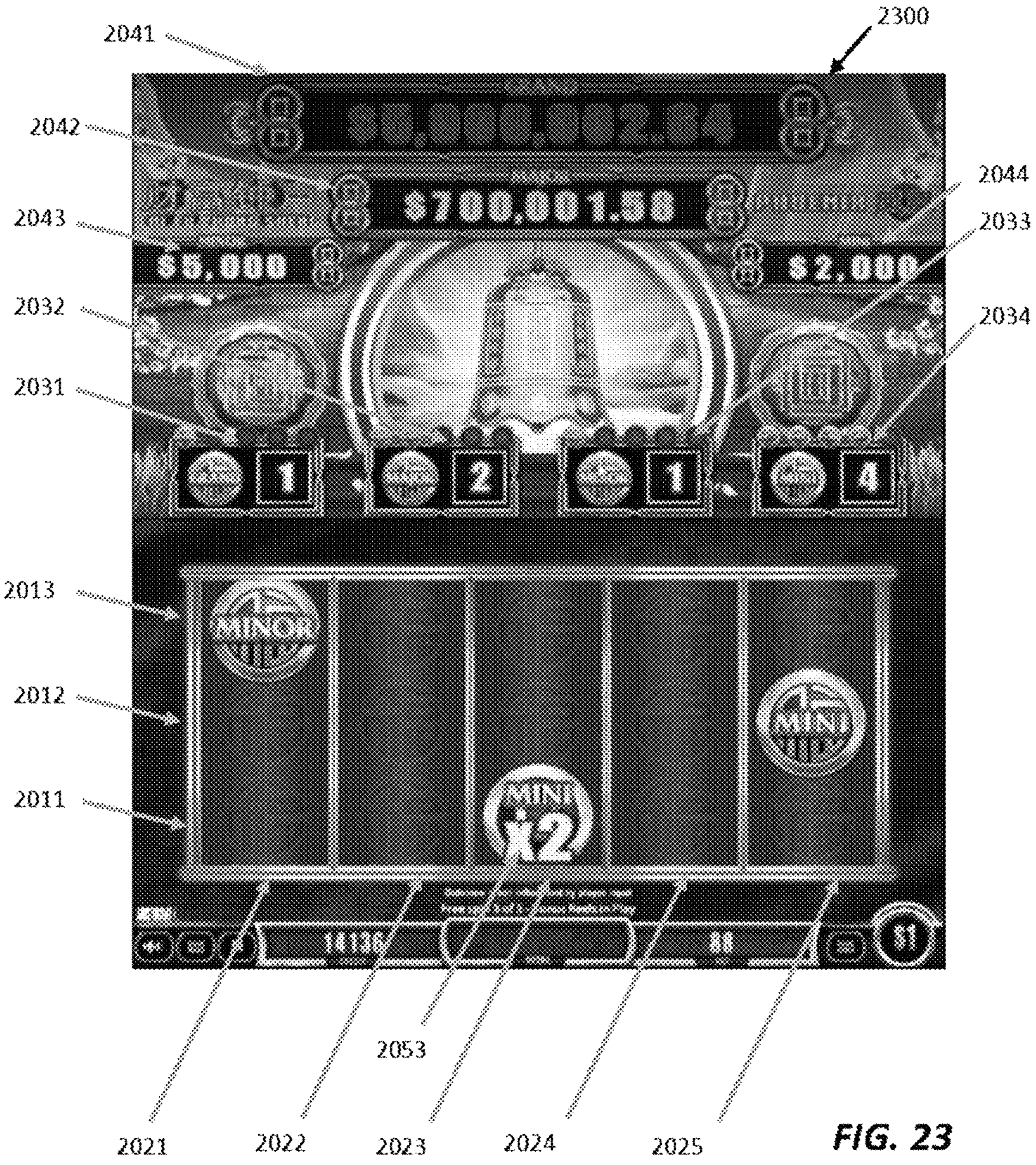

FIG. 23 is an example screen display 2300 of a third game instance, in which a Minor award symbol (first column, top row), and two Mini award symbols (third column, bottom row and fifth column, middle row) are displayed. Processor 204 has updated Minor award indicator 2033 and Mini award indicator 2034 to reflect the displayed symbols. Mini award symbol 2053 incorporates a ×2 multiplier as set by the processor at step 630, accordingly, processor 204 has also update Mini bonus award indicator 2044 by doubling it to $2000 relative to the initial value of $1000 shown in FIGS. 21 and 22.

Figure 24:
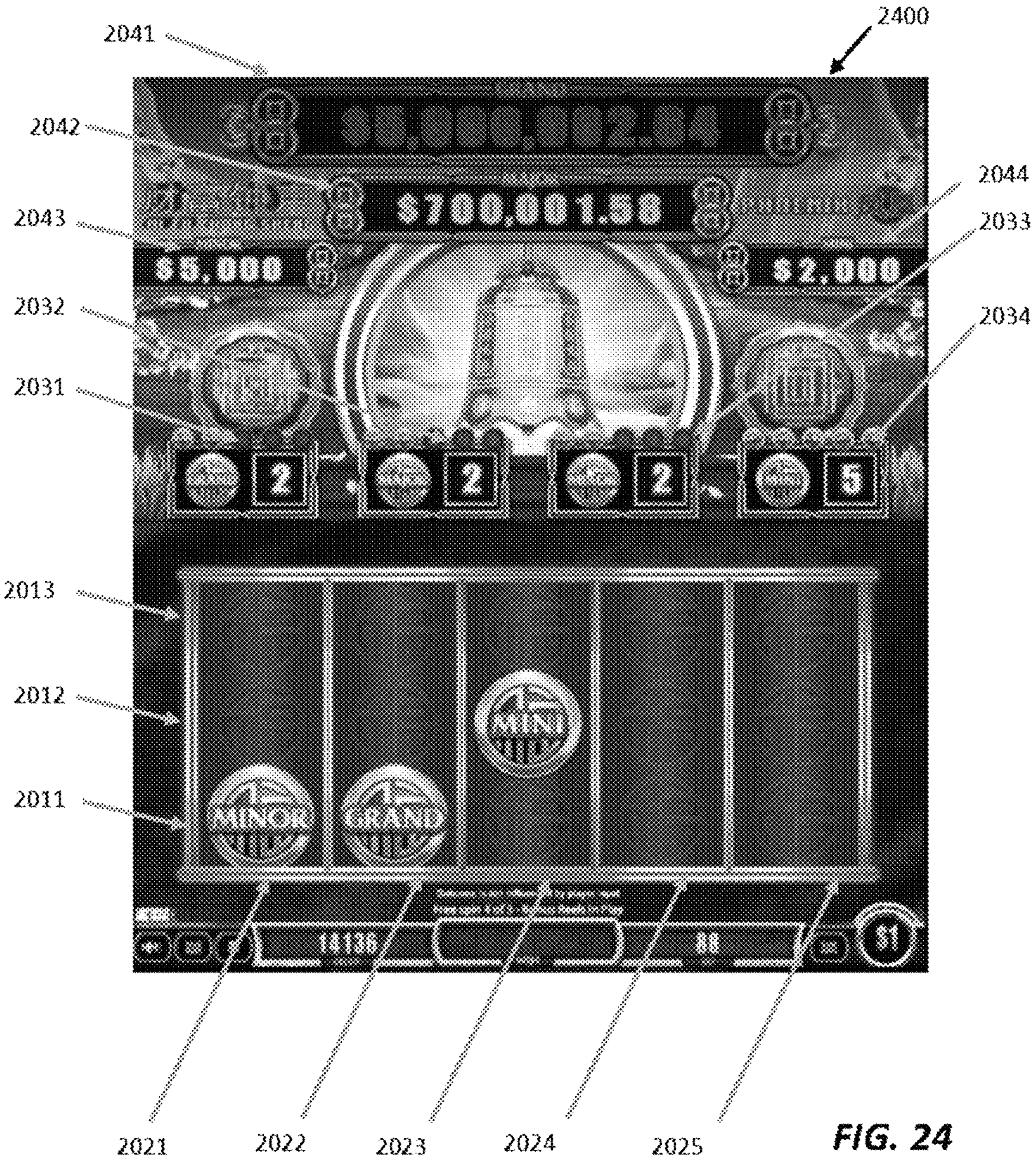
Figure 25:

FIG. 24 is an example screen display 2400 of a third game instance, in which a Minor award symbol (first column, bottom row), a Grand symbol (second column, bottom row) and Mini award symbol (third column, middle row) are displayed. Processor 204 has updated Grand award indicator 2031, Minor award indicator 2033 and Mini award indicator 2034 to reflect the displayed symbols. In this respect, Mini award indicator 2034 now shows that five Mini award symbols have been collected. Accordingly, in this example, processor 204 controls display 240 to display an award 2560 of the Mini Bonus as shown in example screen display 2500 of FIG. 25.

Figure 26:
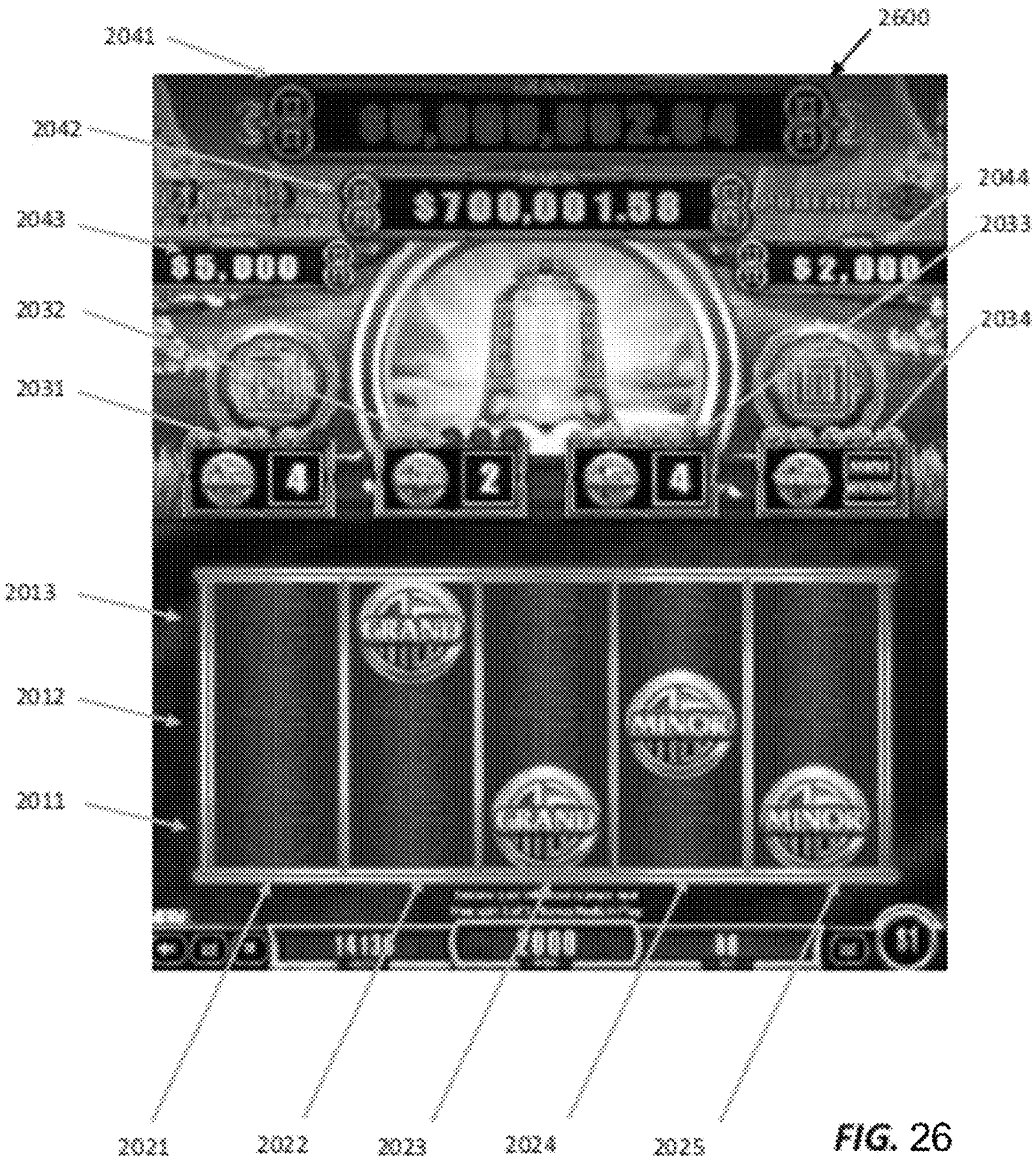

Processor 204 will continue to display any remaining game instances of the pathway. In this example, processor 204 controls display 240 to display a screen display 2600 of the fifth game instance as shown in FIG. 26 in which two further Grand award symbols and two further Minor award symbols are collected.

Figure 27:
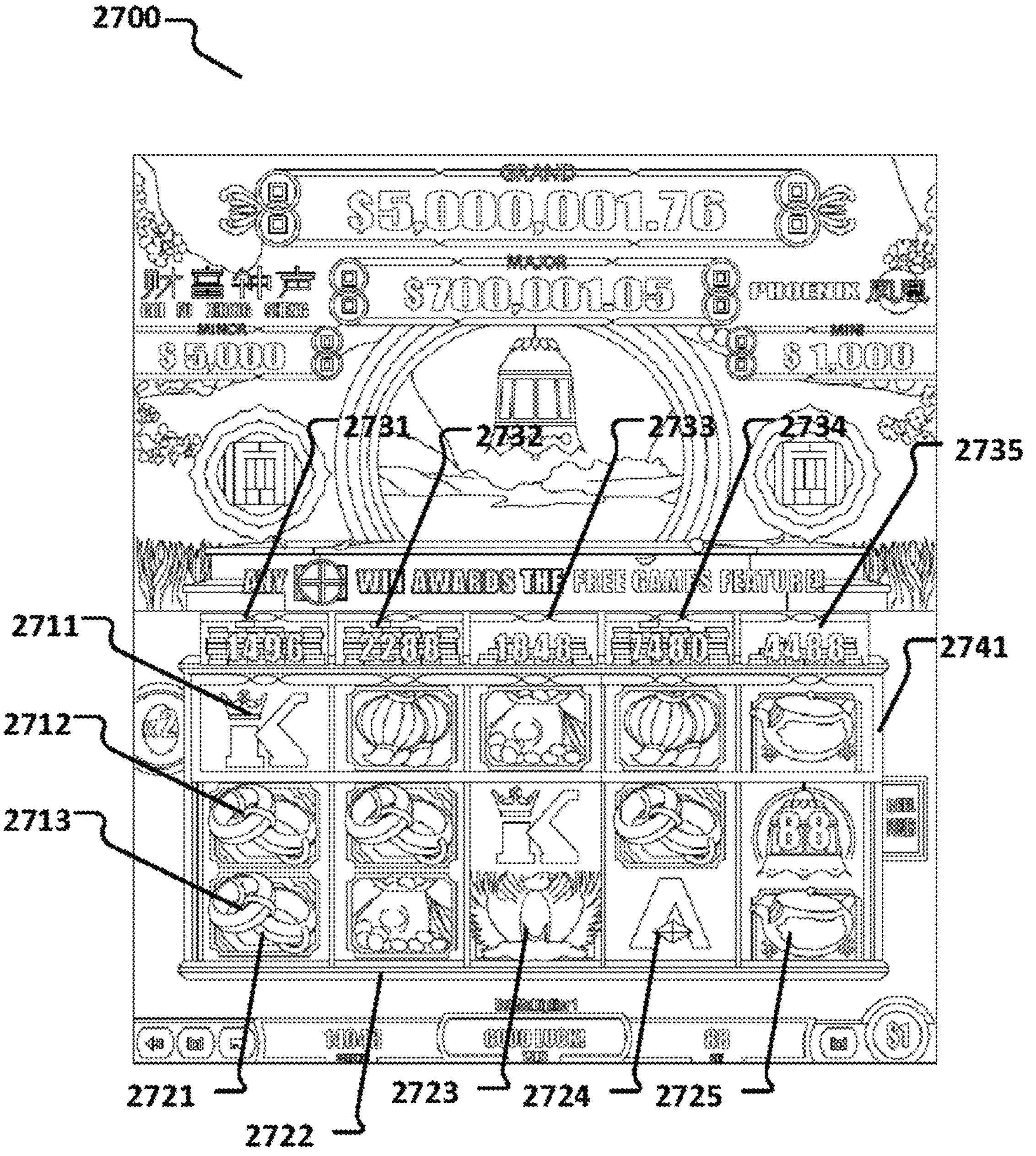

FIG. 27 an example screen display 2700 of an embodiment of a spinning reel game. Symbols may be selected from five configured reel strips for display in five columns of symbol positions 2721-2725 and three rows 2711-2713 of symbol positions. The screen displays may also include prize totals 2731-2735. Additionally, a Lucky Zone 2741 corresponding to the row is indicated by border 2741 to indicate that prize values falling within this zone 2741 may be multiplied (here by a ×2 multiplier) as explained herein.

Figure 28:
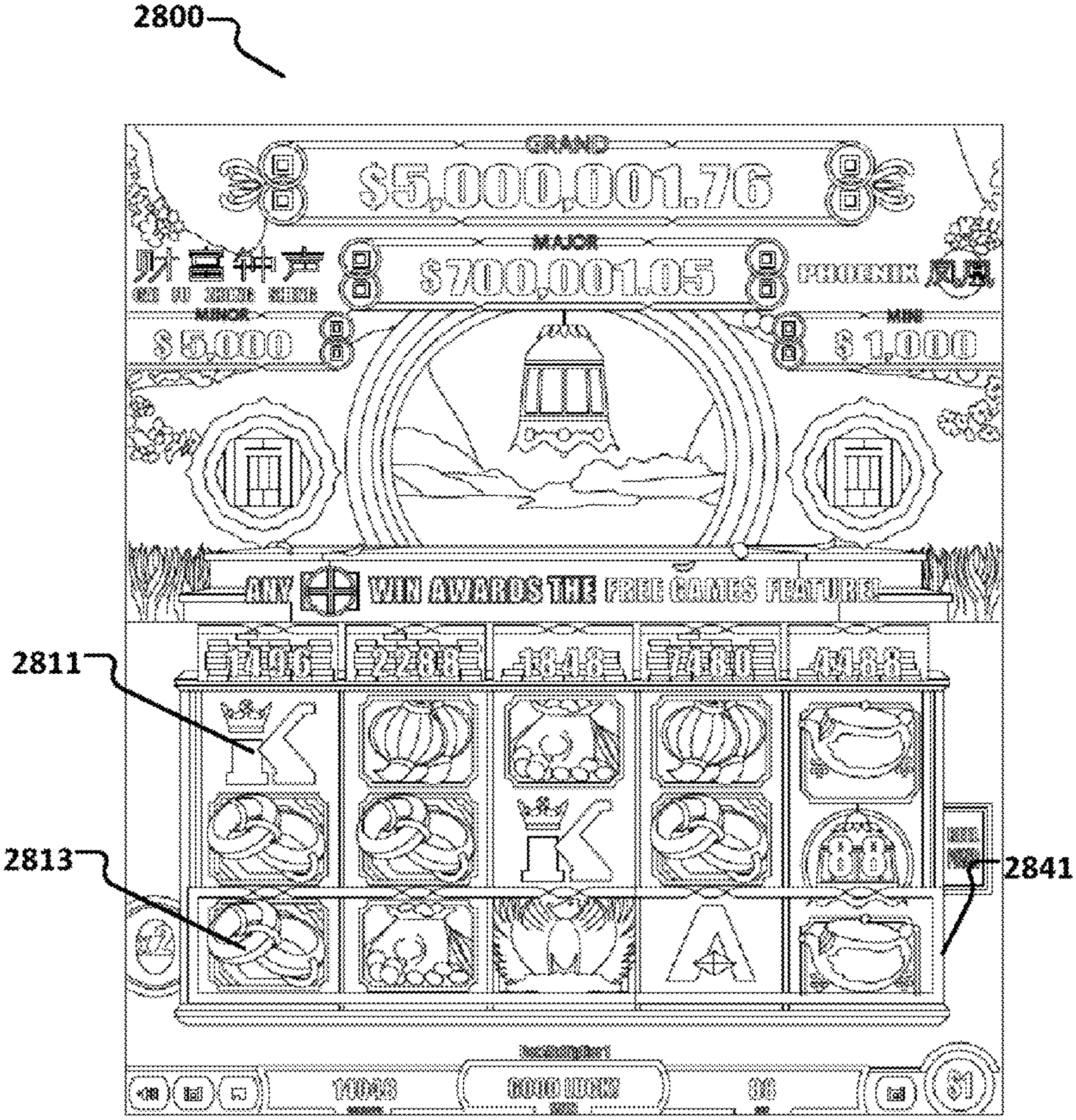

FIG. 28 another example screen display 2800 of an embodiment of a spinning reel game. The screen display may be the same or similar to the screen display of FIG. 27 except the Lucky Zone 2841 now borders the bottom row 2813 rather than the top row 2811. The Lucky Zone 2841 may indicate that prize values falling within this zone 2841 may be multiplied by a ×2 multiplier.

Figure 29:
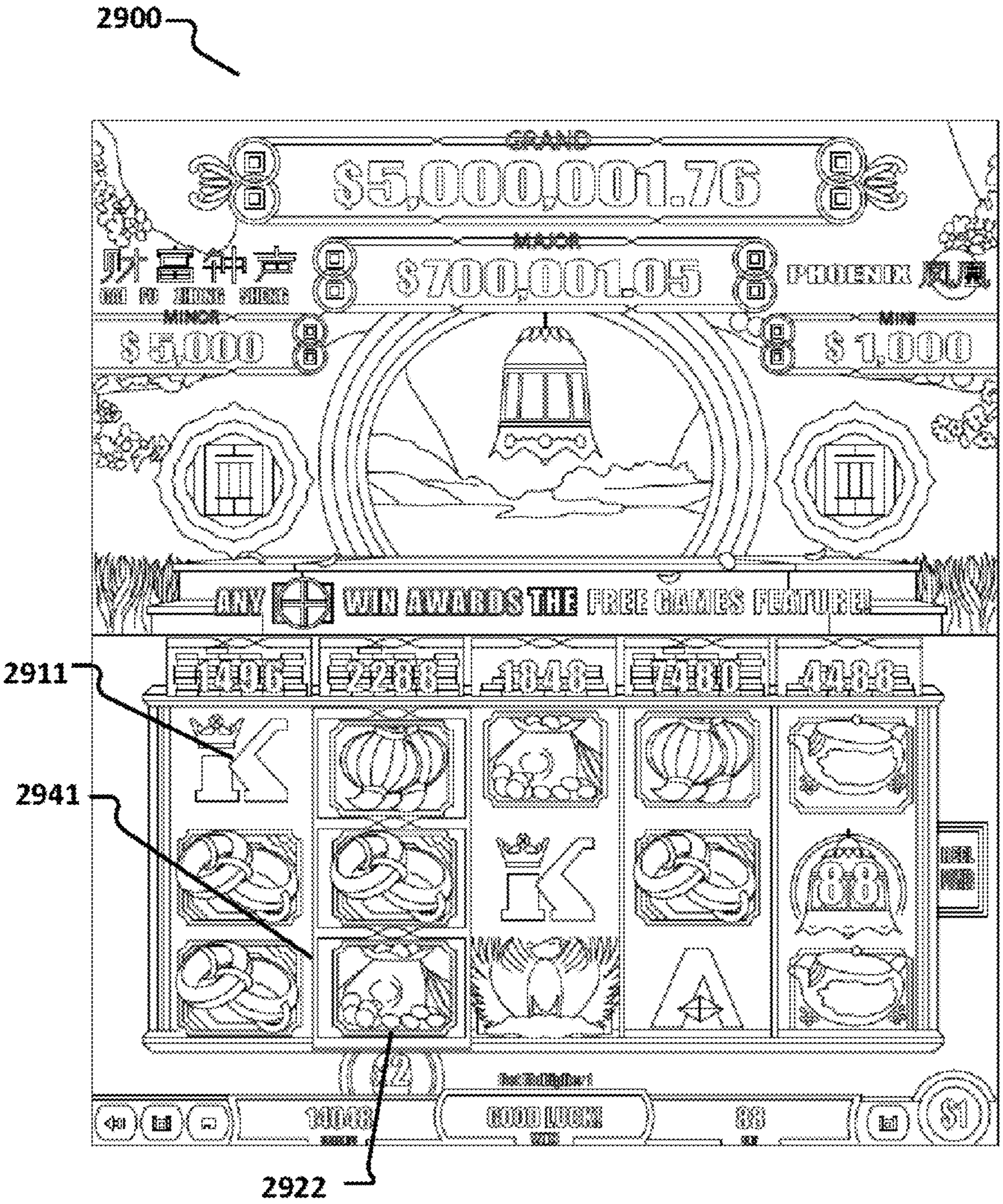

FIG. 29 another example screen display 2900 of an embodiment of a spinning reel game. The screen display may be the same or similar to the screen display of FIG. 27 except the Lucky Zone 2941 now borders the second column from the left 2922 rather than the top column 2911. The Lucky Zone 2841 may again indicate that prize values falling within this zone 2941 may be multiplied by a ×2 multiplier.

Figure 30:
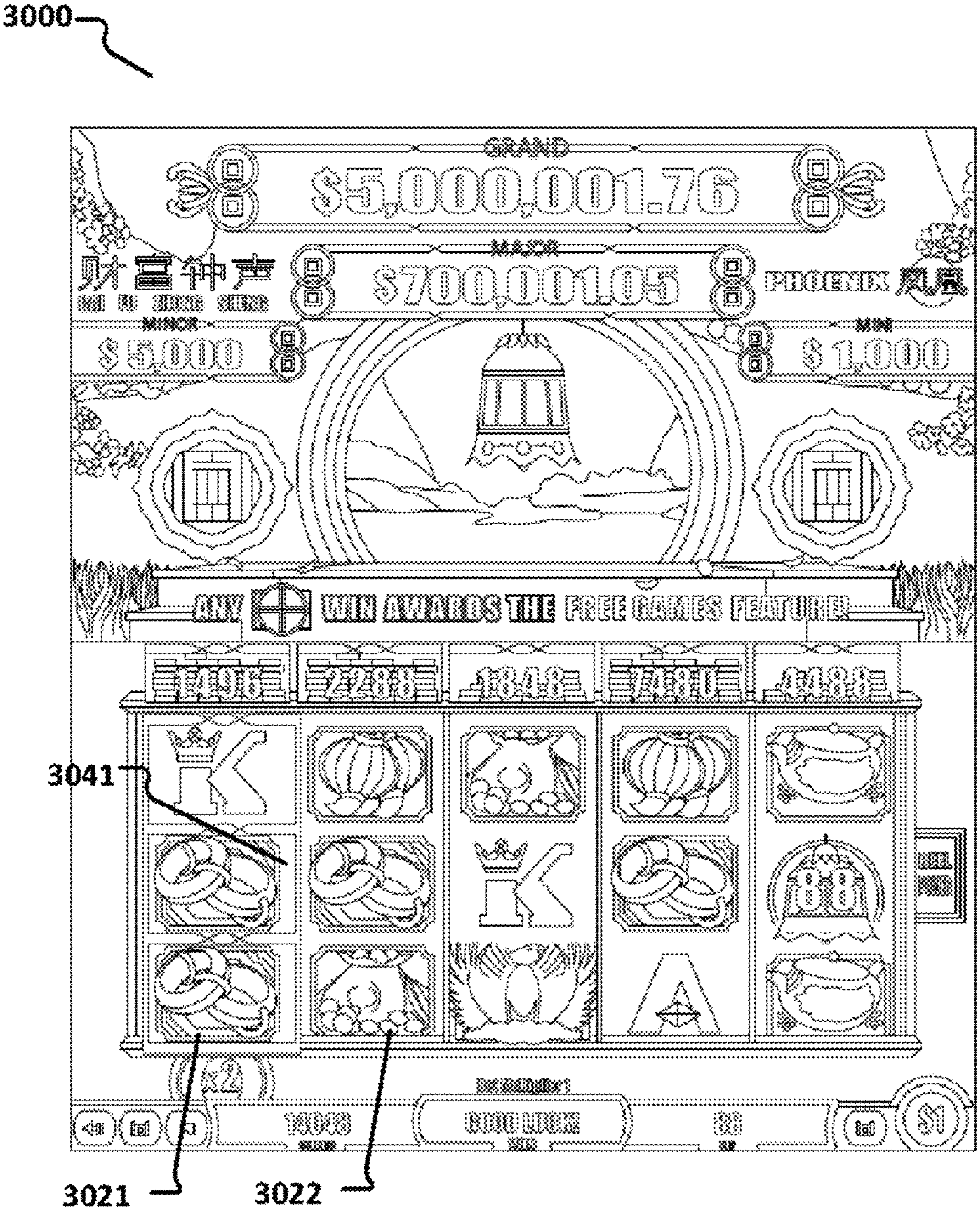

FIG. 30 another example screen display 3000 of an embodiment of a spinning reel game. The screen display may be the same or similar to the screen display of FIG. 27 except the Lucky Zone 3041 now borders the bottom row 2813 rather than the top row 2811. As before, the Lucky Zone 3041 may indicate that prize values falling within this zone 3041 may be multiplied by a ×2 multiplier.

Figure 31:
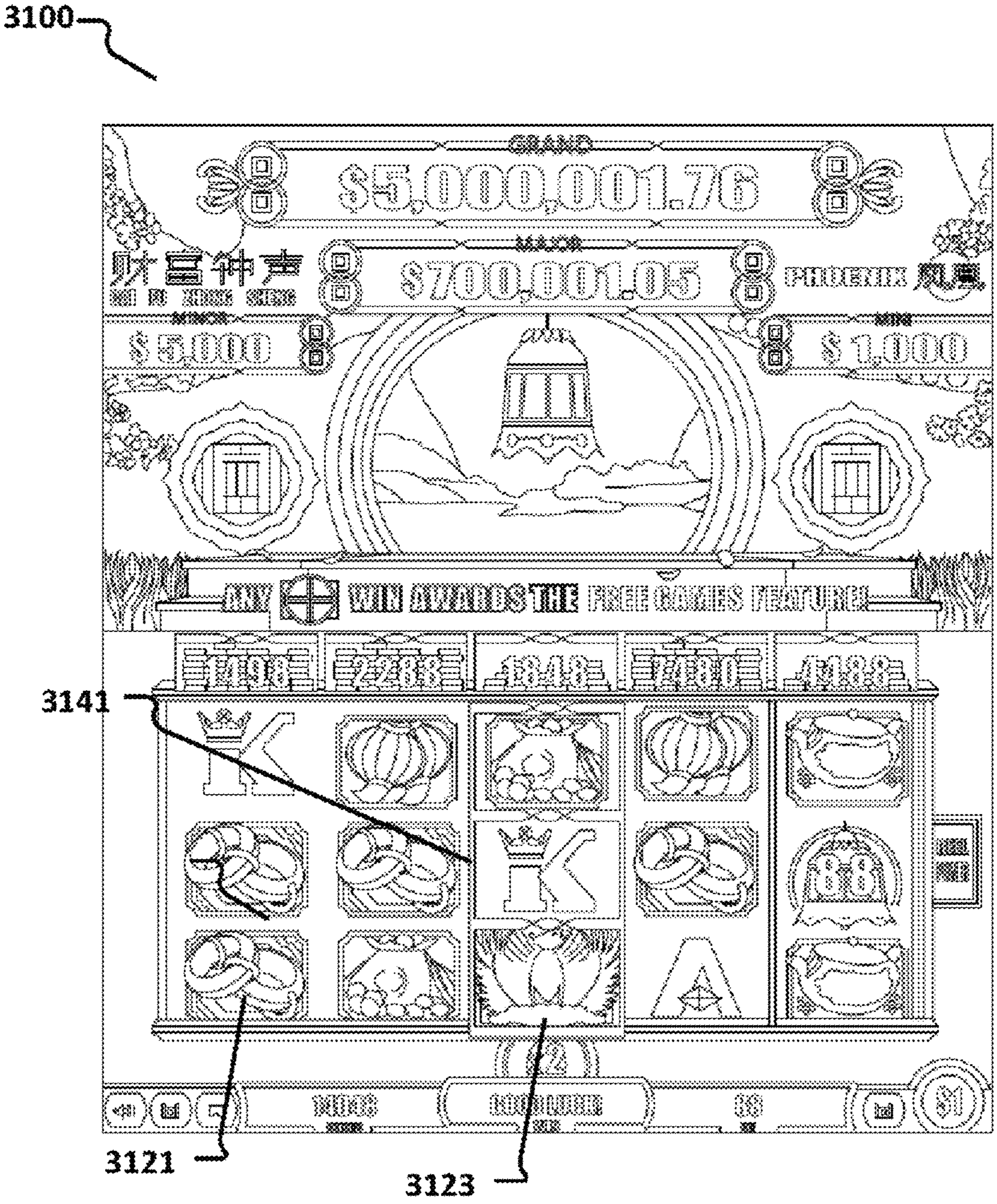

FIG. 31 another example screen display 3100 of an embodiment of a spinning reel game. The screen display may be the same or similar to the screen display of FIG. 27 except the Lucky Zone 3141 now borders the bottom row 2813 rather than the top row 2811. The Lucky Zone 3141 may again indicate that prize values falling within this zone 3141 may be multiplied by a ×2 multiplier.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. A gaming device comprising:

at least one memory storing with instructions stored thereon; and at least one processor in communication with the at least one memory, wherein the instructions, when executed by the at least one processor, cause the at least one processor to:

receive a data signal identifying a first number of columns of a plurality of columns of symbol positions;

designate a first column and a second column of the plurality of columns of symbol positions as active, and a third column of the plurality of columns of symbol positions as inactive, based on the first number of columns;

assign, in response to the first column and the second column being designated as active, a first threshold value to the first column and a second threshold value to the second column;

cause a selection of symbols to display in the plurality of columns of symbol positions, wherein the selection for each column is performed from a corresponding reel strip comprising symbols including award value symbols;

cause a display of at least a current first award total stored in the memory and associated with the first column;

in response to the selected symbols of the first column including an award value symbol, increase the current first award total by a value of the award value symbol;

determine if the current first award total meets or exceeds the first threshold value; and if so, output an award comprising at least the current first award total.

2. The gaming device of claim 1, wherein there are a plurality of award total stored in the memory, each associated with a column of symbol positions, and when the instructions are executed, they cause the processor to cause display of the first award total and a second award total of the plurality of award totals associated with the second column in response to the first column and the second column being designated as active.

3. The gaming device of claim 1, wherein when the processor is further configured to update the current first award total by a designated multiple of the award value in response to the award value symbol being selected for a defined symbol position within the first column.

4. The gaming device of claim 1, wherein the processor is further continued to update the current first award total until a conclusion of a set of game instances and award the current first award total reached at the conclusion of the set of game instances.

5. The gaming device of claim 1, wherein outputting the award further includes adding the current first award total to at a credit meter stored in the memory.

6. The gaming device of claim 1, wherein the processor is further configured to reset the current award total subsequent to outputting the award.

7. The gaming device of claim 1, wherein the processor is further configured to output the award in response to a display of a threshold number of award symbols.

8. The gaming device of claim 1, wherein the processor is further configured to reset the first threshold value subsequent to outputting the award.

9. The gaming device of claim 1, wherein the processor is further configured to select a new first threshold value using a random number generator.

10. The gaming device of claim 9, wherein the new first threshold value is defined by upper and lower award bounds.

11. The gaming device of claim 9, wherein the new first threshold value is one of a plurality of threshold values that vary as between each of the plurality of columns.

12. A method of electronic gaming implemented by at least one processor in communication with at least one memory, the method comprising:

receiving a data signal identifying a first number of columns of a plurality of columns of symbol positions;

designating a first column and a second column of the plurality of columns of symbol positions as active, and a third column of the plurality of columns of symbol positions as inactive, based on the first number of columns;

assigning, in response to the first column and the second column being designated as active, a first threshold value to the first column and a second threshold value to the second column;

causing a selection of symbols to display in the plurality of columns of symbol positions, wherein the selecting for each column is performed from a corresponding reel strip comprising symbols including award value symbols;

causing a display of at least a current first award total stored in the memory and associated with the first column;

in response to the selected symbols of the first column including an award value symbol, increasing the current first award total by a value of the award value symbol;

determining if the current first award total meets or exceeds the first threshold value; and if so, outputting an award comprising at least the current first award total.

13. The method of claim 12, wherein there are a plurality of award totals stored in the memory, and the method further comprises causing display of the first award total and a second award total of the plurality award of totals associated with the second column in response to the first column and the second column being designated as active.

14. The method of claim 12, further comprising updating the current first award total by a designated multiple of the current award value in response to the award value symbol being selected for a defined symbol position of the first column.

15. The method of claim 12, further comprising outputting the award further includes adding the current first award total to at a credit meter stored in the memory.

16. The method of claim 12, further comprising updating the current first award total until a conclusion of a set of game instances and award the current first award total reached at the conclusion of the set of game instances.

17. At least one non-transitory computer-readable storage medium with instructions stored thereon that, in response to execution by at least one processor, cause the at least one processor to:

receive a data signal identifying a first number of columns of a plurality of columns of symbol positions;

designate a first column and a second column of the plurality of columns of symbol positions as active, and a third column of the plurality of columns of symbol positions as inactive, based on the first number of columns;

assign, in response to the first column and the second column being designated as active, a first threshold value to the first column and a second threshold value to the second column;

cause a selection of symbols to display in the plurality of columns of symbol positions, wherein the selection for each column is performed from a corresponding reel strip comprising symbols including award value symbols;

cause a display of at least a current first award total stored in a memory and associated with the first column;

determine a threshold value for the first column;

in response to the selected symbols of the first column including an award value symbol, increase the current first award total by a value of the award value symbol;

determine if the current first award total meets or exceeds the first threshold value; and if so, output an award comprising at least the current first award total.

18. The at least one non-transitory computer-readable storage medium of claim 17, wherein the selection includes selecting for each award symbol a symbol position within the column in which it is to be displayed.

19. The at least one non-transitory computer-readable storage medium of claim 17, wherein a multiplier is assigned to an award symbol in response to a game outcome.

20. The at least one non-transitory computer-readable storage medium of claim 17, wherein a new first threshold value is selected using a random number generator.

* * * * *